United States Patent
Dauneria et al.

(10) Patent No.: US 12,156,280 B2
(45) Date of Patent: Nov. 26, 2024

(54) UE CONTROLLED PDU SESSIONS ON A NETWORK SLICE

(71) Applicant: TELEFONAKTIEBOLAGET LM ERICSSON (PUBL), Stockholm (SE)

(72) Inventors: Ankur Dauneria, New Delhi (IN); George Foti, Dollard des Ormeaux (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 20 days.

(21) Appl. No.: 17/766,505

(22) PCT Filed: Oct. 7, 2020

(86) PCT No.: PCT/IB2020/059424
§ 371 (c)(1),
(2) Date: Apr. 4, 2022

(87) PCT Pub. No.: WO2021/070086
PCT Pub. Date: Apr. 15, 2021

(65) Prior Publication Data
US 2024/0064863 A1 Feb. 22, 2024

Related U.S. Application Data

(60) Provisional application No. 62/911,574, filed on Oct. 7, 2019.

(51) Int. Cl.
*H04W 76/32* (2018.01)
*H04W 76/34* (2018.01)

(52) U.S. Cl.
CPC .......... *H04W 76/32* (2018.02); *H04W 76/34* (2018.02)

(58) Field of Classification Search
CPC .............................. H04W 76/32; H04W 76/34
See application file for complete search history.

(56) References Cited

U.S. PATENT DOCUMENTS

2018/0199398 A1* 7/2018 Dao ...................... H04W 76/34
2018/0368205 A1* 12/2018 Park ...................... H04W 76/34
(Continued)

FOREIGN PATENT DOCUMENTS

| WO | 2018230982 A1 | 12/2018 |
|---|---|---|
| WO | 2019034249 A1 | 2/2019 |

OTHER PUBLICATIONS

Samsung, Session release procedures for multiple PDU sessions, SA WG2 Meeting #115, S2-162521, May 23-27, 2016, Nanjing, P.R. China.
(Continued)

*Primary Examiner* — Tejis Daya
(74) *Attorney, Agent, or Firm* — Ericsson Inc.

(57) ABSTRACT

Methods and apparatus for bulk PDU session release between a wireless device and a control plane entity in a wireless system such as for example a 5G core network or similar is provided. The method comprises the wireless device determines that two or more Packet Data Unit, PDU, sessions established within the wireless system that are associated to at least one Data network identified by a Data Network Name, DNN, or to at least one Single Network Slice Assisted Information, S-NSSAI, should be released and transmits to a control entity of a core network, a Non-Access-Stratum, NAS, message indicating one of the at least one DNN or the at least one S-NSSAI for which the corresponding PDU sessions should be released all at once with a single message.

9 Claims, 17 Drawing Sheets

(56) References Cited

U.S. PATENT DOCUMENTS

| | | | |
|---|---|---|---|
| 2019/0098536 A1 | 3/2019 | Qiao | |
| 2020/0137639 A1* | 4/2020 | Yuan | H04W 36/0011 |
| 2021/0037585 A1* | 2/2021 | Youn | H04W 60/06 |
| 2021/0136858 A1* | 5/2021 | Kawasaki | H04W 72/04 |
| 2021/0250854 A1* | 8/2021 | Olvera-Hernandez | H04W 48/16 |
| 2023/0189189 A1* | 6/2023 | Venkataraman | H04W 60/005 |
| | | | 455/435.3 |

OTHER PUBLICATIONS

3GPP, 3rd Generation Partnership Project, Technical Specification Group Radio Access Network;NG-RAN; NG Application Protocol (NGAP), TS 38.413 V15.5.0 (Sep. 2019).

3GPP; 3GPP TS 23.501 V16.0.2, "3rd Generation Partnership Project; Technical Specification Group Services and System Aspects; System Architecture for the 5G System; Stage 2 (Release 16)". Apr. 2019.

Ericsson, PDU Session NAS-PDU in PDU Session Resource Release Command, 3GPP TSG-RAN WG3 Meeting #104, R3-192990, Reno, U.S.A., May 13-17, 2019.

Ericsson, PDU Session NAS-PDU in PDU Session Resource Release Command, R3-194190, 3GPP TSG-RAN WG3 Meeting #105, Ljubljana, Slovenien, Aug. 26-30, 2019.

ETSI MCC, Report of 3GPP TSG RAN meeting #104, 3GPP TSG RAN meeting #105, R3-193301, Ljubljana, Slovenia, Aug. 26-30, 2019. Listed in ISR as R3-194530.

LG Electronics et al., Support of UE Sidelink AMBR for V2X over NG, 3GPP TSG-RAN WG3 Meeting # 105, R3-193493, Ljubljana, Slovenia, Aug. 26-30, 2019.

ISR and Written Opinion dated Dec. 4, 2020, from corresponding application PCT/IB2020/059424.

* cited by examiner

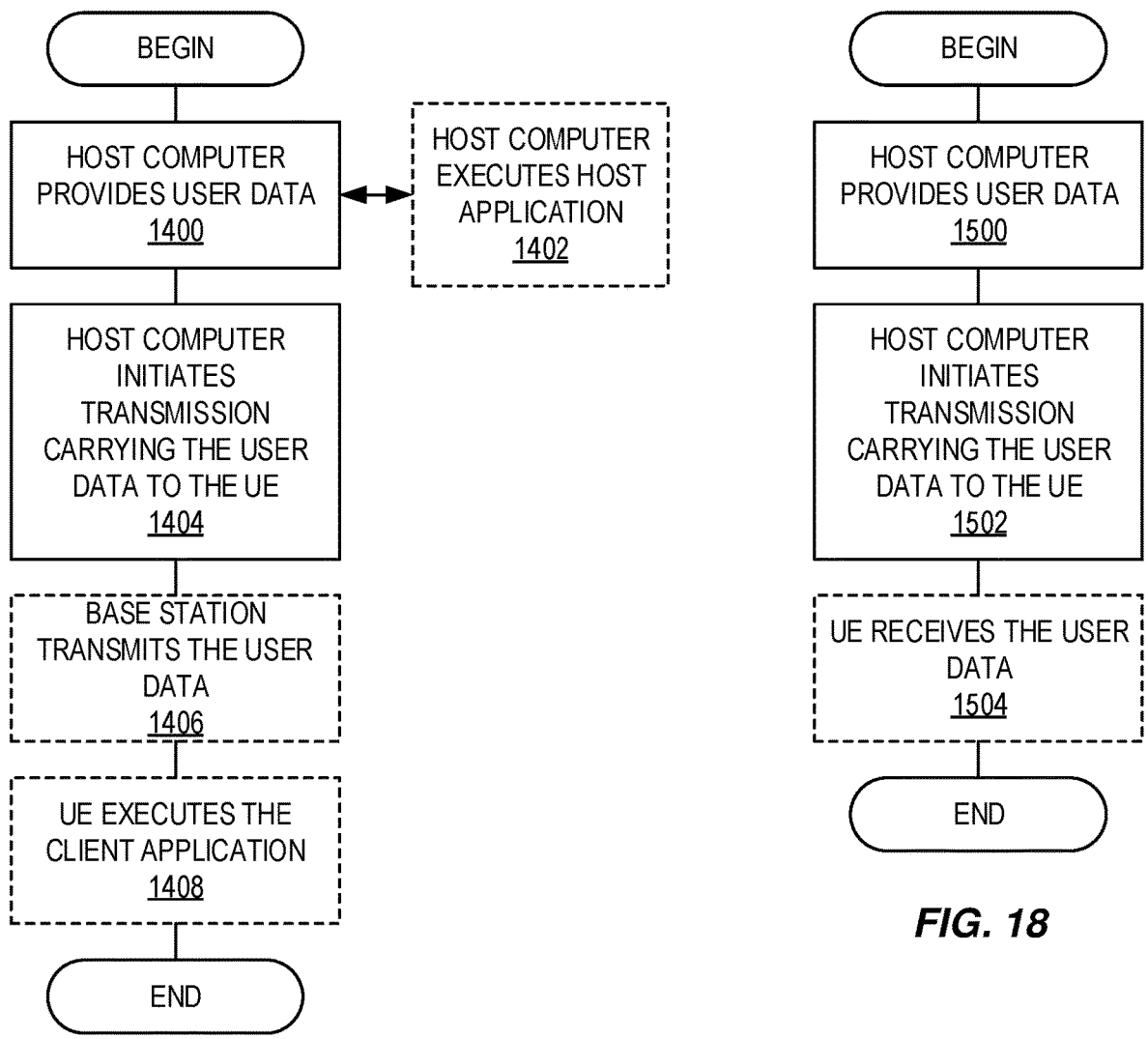

UE CONTROLLED PDU SESSIONS ON A NETWORK SLICE

RELATED APPLICATIONS

This application claims the benefit of provisional patent application Ser. No. 62/911,574, filed Oct. 7, 2019, the disclosure of which is hereby incorporated herein by reference in its entirety.

TECHNICAL FIELD

The present disclosure relates generally to session management, and more particularly, to management of a Packet Data Unit Session and network slices.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

In the current art, a UE may establish one or more PDU sessions for a DNN on a slice as illustrated in FIG. 1*a* (Prior art).

The procedure assumes that the UE has already registered on the AMF thus unless the UE is Emergency Registered the AMF has already retrieved the user subscription data from the UDM.

1. From UE to AMF: NAS Message (S-NSSAI(s), UE Requested DNN, PDU Session ID, Request type, Old PDU Session ID, N1 SM container (PDU Session Establishment Request)).

In order to establish a new PDU Session, the UE generates a new PDU Session ID.

The UE initiates the UE Requested PDU Session Establishment procedure by the transmission of a NAS message containing a PDU Session Establishment Request within the N1 SM container. The PDU Session Establishment Request includes a PDU session ID, Requested PDU Session Type, a Requested SSC mode, 5GSM Capability, PCO, SM PDU DN Request Container, [Number Of Packet Filters], [Header Compression Configuration], UE Integrity Protection Maximum Data Rate, and [Always-on PDU Session Requested].

[ . . . ]

The UE includes the S-NSSAI from the Allowed NSSAI of the current access type. If the Mapping of Allowed NSSAI was provided to the UE, the UE shall provide both the S-NSSAI of the VPLMN from the Allowed NSSAI and the corresponding S-NSSAI of the HPLMN from the Mapping Of Allowed NSSAI.

[ . . . ]

2. The AMF determines that the message corresponds to a request for a new PDU Session based on that Request Type indicates "initial request" and that the PDU Session ID is not used for any existing PDU Session(s) of the UE. If the NAS message does not contain an S-NSSAI, the AMF determines a default S-NSSAI of the HPLMN for the requested PDU Session either according to the UE subscription, if it contains only one default S-NSSAI, or based on operator policy and, in the case of LBO, an S-NSSAI of the Serving PLMN which matches the S-NSSAI of the HPLMN. When the NAS Message contains an S-NSSAI of the Serving PLMN but it does not contain a DNN, the AMF determines the DNN for the requested PDU Session by selecting the default DNN for this S-NSSAI if the default DNN is present in the UE's Subscription Information (or for the corresponding S-NSSAI of the HPLMN, in the case of LBO); otherwise the serving AMF selects a locally configured DNN for this S-NSSAI of the Serving PLMN. If the AMF cannot select an SMF (e.g. the UE requested DNN is not supported by the network, or the UE requested DNN is not in the Subscribed DNN List for the S-NSSAI (or its mapped value for the HPLMN in the case of LBO) and wildcard DNN is not included in the Subscribed DNN list), the AMF shall, based on operator policies received from PCF, either reject the NAS Message containing PDU Session Establishment Request from the UE with an appropriate cause or request PCF to replace the UE requested DNN by a selected DNN. If the DNN requested by the UE is present in the UE subscription information but indicated for replacement, the AMF shall request the PCF to perform a DNN replacement to a selected DNN. AMF requests DNN replacement as specified in clause 4.16.2.1.1. If the DNN requested by the UE is present in the UE subscription information but not supported by the network and not indicated for replacement, the AMF shall reject the NAS Message containing PDU Session Establishment Request from the UE with an appropriate cause value.

The AMF selects an SMF as described in clause 6.3.2 of TS 23.501 [2] and clause 4.3.2.2.3. If the Request Type indicates "Initial request" or the request is due to handover from EPS or from non-3GPP access serving by a different AMF, the AMF stores an association of the S-NSSAI(s), the DNN, the PDU Session ID, the SMF ID as well as the Access Type of the PDU Session.

[ . . . ].

3. From AMF to SMF: Either Nsmf_PDUSession_CreateSMContext Request (SUPI, selected DNN, UE requested DNN, S-NSSAI(s), PDU Session ID, AMF ID, Request Type, PCF ID, Priority Access, [Small Data Rate Control Status], N1 SM container (PDU Session Establishment Request), User location information, Access Type, PEI, GPSI, UE presence in LADN service area, Subscription For PDU Session Status Notification, DNN Selection Mode, Trace Requirements, Control Plane CIoT 5GS Optimisation indication, or Control Plane Only indicator) or Nsmf_PDUSession_UpdateSMContext Request (SUPI, DNN, S-NSSAI(s), SM Context ID, AMF ID, Request Type, N1 SM container (PDU Session Establishment Request), User location information, Access Type, RAT type, PEI).

[ . . . ]

The AMF sends the S-NSSAI of the Serving PLMN from the Allowed NSSAI to the SMF. For roaming scenario in local breakout (LBO), the AMF also sends the corresponding S-NSSAI of the HPLMN from the Mapping Of Allowed NSSAI to the SMF.

[ . . . ]

4. If Session Management Subscription data for corresponding SUPI, DNN and S-NSSAI of the HPLMN is not 50 available, then SMF retrieves the Session Management Subscription data using Nudm_SDM_Get (SUPI, Session Management Subscription data, selected DNN, S-NSSAI of the HPLMN) and subscribes to be notified when this subscription data is modified using Nudm_SDM_Subscribe (SUPI, Session Management Subscription data, selected DNN, S-NSSAI of the HPLMN). UDM may get this information from UDR by Nudr_DM_Query (SUPI, Subscription Data, Session Management Subscription data, selected DNN, S-NSSAI of the HPLMN) and may subscribe to notifications from UDR for the same data by Nudr_DM_subscribe.

The SMF may use DNN Selection Mode when deciding whether to retrieve the Session Management Subscription data e.g. in case the (selected DNN, S-NSSAI of the HPLMN) is not explicitly subscribed, the SMF may use local configuration instead of Session Management Subscription data.

[ . . . ]

5. From SMF to AMF: Either Nsmf_PDUSession_CreateSMContext Response (Cause, SM Context ID or N1 SM container (PDU Session Reject (Cause))) or an Nsmf_PDUSession_UpdateSMContext Response depending on the request received in step 3.

If the SMF received Nsmf_PDUSession_CreateSMContext Request in step 3 and the SMF is able to process the PDU Session establishment request, the SMF creates an SM context and responds to the AMF by providing an SM Context ID.

[ . . . ].

7b. The SMF may perform an SM Policy Association Establishment procedure as defined in clause 4.16.4 to establish an SM Policy Association with the PCF and get the default PCC Rules for the PDU Session. The GPSI shall be included if available at SMF. If the Request Type in step 3 indicates "Existing PDU Session", the SMF may provide information on the Policy Control Request Trigger condition(s) that have been met by an SMF initiated SM Policy Association Modification procedure as defined in clause 4.16.5.1. The PCF may provide policy information defined in clause 5.2.5.4 (and in TS 23.503 pop to SMF.

[ . . . ].

8. If the Request Type in step 3 indicates "Initial request", the SMF selects an SSC mode for the PDU Session as described in TS 23.501 [2] clause 5.6.9.3. The SMF also selects one or more UPFs as needed as described in TS 23.501 [2] clause 6.3.3. In case of PDU Session Type IPv4 or IPv6 or IPv4v6, the SMF allocates an IP address/prefix for the PDU Session (unless configured otherwise) as described in TS 23.501 [2] clause 5.8.2. In case of PDU Session Type IPv6 or IPv4v6, the SMF also allocates an interface identifier to the UE for the UE to build its link-local address. For Unstructured PDU Session Type the SMF may allocate an IPv6 prefix for the PDU Session and N6 point-to-point tunnelling (based on UDP/IPv6) as described in TS 23.501 [2] clause 5.6.10.3. For Ethernet PDU Session Type, neither a MAC nor an IP address is allocated by the SMF to the UE for this PDU Session.

[ . . . ].

9. SMF may perform an SMF initiated SM Policy Association Modification procedure as defined in clause 4.16.5.1 to provide information on the Policy Control Request Trigger condition(s) that have been met. If Request Type is "initial request" and dynamic PCC is deployed and PDU Session Type is IPv4 or IPv6 or IPv4v6, SMF notifies the PCF (if the Policy Control Request Trigger condition is met) with the allocated UE IP address/prefix(es).

[ . . . ].

10. If Request Type indicates "initial request", the SMF initiates an N4 Session Establishment procedure with the selected UPF, otherwise it initiates an N4 Session Modification procedure with the selected UPF:

10a. The SMF sends an N4 Session Establishment/Modification Request to the UPF and provides Packet detection, enforcement and reporting rules to be installed on the UPF for this PDU Session. If the SMF is configured to request IP address allocation from UPF as described in TS 23.501 [2] clause 5.8.2 then the SMF indicates to the UPF to perform the IP address/prefix allocation, and includes the information required for the UPF to perform the allocation. If CN Tunnel Info is allocated by the SMF, the CN Tunnel Info is provided to UPF in this step. If the selective User Plane deactivation is required for this PDU Session, the SMF determines the Inactivity Timer and provides it to the UPF. The SMF provides Trace Requirements to the UPF if it has received Trace Requirements. If the Reliable Data Service is enabled for the PDU Session by the SMF as specified in TS 23.501 [2], the RDS Configuration information is provided to the UPF in this step. The SMF provides Small Data Rate Control parameters to the UPF for the PDU Session, if required. The SMF provides the Small Data Rate Control Status to the UPF, if received from the AMF.

[ . . . ].

10b. The UPF acknowledges by sending an N4 Session Establishment/Modification Response. If the SMF indicates in step 10a that IP address/prefix allocation is to be performed by the UPF then this response contains the requested IP address/prefix. If CN Tunnel Info is allocated by the UPF, the CN Tunnel Info is provided to SMF in this step. If SMF requested UPF to provide port numbers then UPF includes port numbers for the NW-TT port and the DS-TT port in the response. If SMF indicated the UPF to perform packet duplication and elimination for the QoS Flow in step 10a, and CN Tunnel Info is allocated by UPF, two CN Tunnel Info are allocated by the UPF and provided to the SMF. If SMF decides to insert two I-UPFs between the PSA UPF and the NG-RAN for redundant transmission, CN Tunnel Info of two I-UPFs and the UPF (PSA) are allocated by the UPFs and provided to the SMF. The UPF indicates the SMF that one CN Tunnel Info is used as the redundancy tunnel of the PDU session as described in clause 5.33.2.2 of TS 23.501 [2].

[ . . . ].

11. SMF to AMF: Namf_Communication_N1N2MessageTransfer (PDU Session ID, N2 SM information (PDU Session ID, QFI(s), QoS Profile(s), CN Tunnel Info, S-NSSAI from the Allowed NSSAI, Session-AMBR, PDU Session Type, User Plane Security Enforcement information, UE Integrity Protection Maximum Data Rate, RSN), N1 SM container (PDU Session Establishment Accept ([QoS Rule(s) and QoS Flow level QoS parameters if needed for the QoS Flow(s) associated with the QoS rule(s)], selected SSC mode, S-NSSAI(s), UE Requested DNN, allocated IPv4 address, interface identifier, Session-AMBR, selected PDU Session Type, [Reflective QoS Timer] (if available), [P-CSCF address(es)], [Control Plane Only indicator], [Header Compression Configuration], [Always-on PDU Session Granted], [Small Data Rate Control parameters], [Small Data Rate Control Status]))). If multiple UPFs are used for the PDU Session, the CN Tunnel Info contain tunnel information related with the UPF that terminates N3.

[ . . . ].

12. AMF to (R)AN: N2 PDU Session Request (N2 SM information, NAS message (PDU Session ID, N1 SM container (PDU Session Establishment Accept)), [CN assisted RAN parameters tuning]).

[ . . . ].

13. (R)AN to UE: The (R)AN may issue AN specific signalling exchange with the UE that is related with the information received from SMF. For example, in case of a NG-RAN, an RRC Connection Reconfiguration may take place with the UE establishing the necessary NG-RAN resources related to the QoS Rules for the PDU Session request received in step 12.

[ . . . ].

14. (R)AN to AMF: N2 PDU Session Response (PDU Session ID, Cause, N2 SM information (PDU Session ID, AN Tunnel Info, List of accepted/rejected QFI(s), User Plane Enforcement Policy Notification)).

[ . . . ].

15. AMF to SMF: Nsmf_PDUSession_UpdateSMContext Request (SM Context ID, N2 SM information, Request Type).

The AMF forwards the N2 SM information received from (R)AN to the SMF.

[ . . . ].

16a. The SMF initiates an N4 Session Modification procedure with the UPF. The SMF provides AN Tunnel Info to the UPF as well as the corresponding forwarding rules.

[ . . . ].

16b. The UPF provides an N4 Session Modification Response to the SMF.

[ . . . ].

16c. If Request Type in step 3 indicates neither "Emergency Request" nor "Existing Emergency PDU Session" and, if the SMF has not yet registered for this PDU Session, then the SMF registers with the UDM using Nudm_UECM_Registration (SUPI, DNN, PDU Session ID, SMF Identity) for a given PDU Session. As a result, the UDM stores following information: SUPI, SMF identity and the associated DNN and PDU Session ID. The UDM may further store this information in UDR by Nudr_DM_Update (SUPI, Subscription Data, UE context in SMF data).

[ . . . ].

17. SMF to AMF: Nsmf_PDUSession_UpdateSMContext Response (Cause).

[ . . . ].

After this step, the AMF forwards relevant events subscribed by the SMF.

18. [Conditional] SMF to AMF: Nsmf_PDUSession_SMContextStatusNotify (Release)

If during the procedure, any time after step 5, the PDU Session establishment is not successful, the SMF informs the AMF by invoking Nsmf_PDUSession_SMContextStatusNotify (Release). The SMF also releases any N4 session(s) created, any PDU Session address if allocated (e.g. IP address) and releases the association with PCF, if any. In this case, step 19 is skipped.

19. SMF to UE: In the case of PDU Session Type IPv6 or IPv4v6, the SMF generates an IPv6 Router Advertisement and sends it to the UE. If Control Plane CIoT 5GS Optimisation is enabled for this PDU Session the SMF sends the IPv6 Router Advertisement via the AMF for transmission to the UE using the Mobile Terminated Data Transport in Control Plane CIoT 5GS Optimisation procedures (see clause 4.24.2), otherwise the SMF sends the IPv6 Router Advertisement via N4 and the UPF.

To release the PDU sessions, the UE sends one NAS message to release each PDU session. The PDU Session Release procedure is used to release all the resources associated with a PDU Session, including:

The IP address/Prefixes allocated for an IP-based PDU Session; this may include the release of multiple Prefixes in case of Multi-homing (as defined in TS 23.501 pp.

Any UPF resource (including N3/N9/N19 termination) that was used by the PDU Session. For N19 termination, the UPF resource may be released if all the PDU Sessions associated with the 5G VN group are released.

Any access resource that was used by the PDU Session.

Furthermore, the PDU session release procedure disclosed today in 3GPP TS 23.502 V.16.2.0 is illustrated in FIG. 1b (Prior Art). The steps are described in 3GPP TS 23.502 clause 4.3.4.2 "UE or network requested PDU Session Release for Non-Roaming and Roaming with Local Breakout" as the following:

1. The procedure is triggered by one of the following events:

1a. (UE requested) The UE initiates the UE Requested PDU Session Release procedure by the transmission of an NAS message (N1 SM container (PDU Session Release Request (PDU session ID)), PDU Session ID) message. The NAS message is forwarded by the (R)AN to the AMF with an indication of User Location Information. This message is relayed to the SMF corresponding to the PDU Session ID via N2 and the AMF. The AMF invokes the Nsmf_PDUSession_UpdateSMContext service operation and provides the N1 SM container to the SMF together with User Location Information (ULI) received from the (R)AN.

[ . . . ]

1b. (PDU Session Release initiated by the PCF) The PCF may invoke an SM Policy Association Termination procedure as defined in clause 4.16.6 to request the release of the PDU Session.

1c. The AMF may invoke the Nsmf_PDUSession_ReleaseSMContext service operation to request the release of the PDU Session in case of mismatch of PDU Session status between UE and AMF.

1d. (R)AN may decide to indicate to the SMF that the PDU Session related resource is released, e.g. when all the QoS Flow(s) of the PDU Session are released.

[ . . . ]

1e. (PDU Session Release initiated by the SMF) The SMF may decide to release a PDU Session under the following scenarios:

Based on a request from the DN (cancelling the UE authorization to access to the DN);

Based on a request from the UDM (subscription change) or from the CHF;

If the SMF received an event notification from the AMF that the UE is out of LADN service area Based on locally configured policy (e.g. the release procedure may be related with the UPF re-allocation for SSC mode 2/mode 3); or If the SMF is notified by the (R)AN that the PDU Session resource establishment has failed during mobility procedure.

If the SMF receives one of the triggers in step 1a, 1b, 1c, or 1e the SMF starts PDU Session Release procedure.

1f. The AMF may invoke the Nsmf_PDUSession_UpdateSMContext service operation with a release indication to request the release of the PDU Session where N1 or N2 SM signalling may be needed before releasing the SM context.

2. The SMF releases the IP address/Prefix(es) that were allocated to the PDU Session and releases the corresponding User Plane resources:

2a. The SMF sends an N4 Session Release Request (N4 Session ID) message to the UPF(s) of the PDU Session. The UPF(s) shall drop any remaining packets of the PDU Session and release all tunnel resource and contexts associated with the N4 Session.

2b. The UPF(s) acknowledges the N4 Session Release Request by the transmission of an N4 Session Release Response (N4 Session ID, [Small Data Rate Control Status]) message to the SMF.

The UPF includes Small Data Rate Control Status if the PDU Session used Small Data Rate Control.

[ . . . ]

3 If the PDU Session Release is initiated by the PCF and SMF, and the SMF has been notified by the AMF that UE is unreachable, e.g. due to the UE is in MICO mode or periodical registration failure, the procedure continues in step 11 by SMF notifying the AMF that the PDU Session is released by invoking the Nsmf_PDUSession_SMContextStatusNotify. The rest of step 3 and the steps 4-10 are skipped.

If the PDU Session Release procedure was triggered by steps 1a, 1b, 1d or 1e above, the SMF creates an N1 SM including PDU Session Release Command message (PDU Session ID, Cause). The Cause may indicate a trigger to establish a new PDU Session with the same characteristics (e.g. when procedures related with SSC mode 2 are invoked).

If the User Plane connection of the PDU Session is activated, the message sent by the SMF to the AMF shall include N2 SM Resource Release request. If the User Plane connection of the PDU Session is not activated, the message sent by the SMF to the AMF shall not include N2 SM Resource Release request.

[ . . . ]

3a. (If the PDU Session Release is initiated by the UE in step 1a or has been triggered by (R)AN in step 1d) The SMF responds to the AMF with the Nsmf_PDUSession_UpdateSMContext response (N2 SM Resource Release request, N1 SM container (PDU Session Release Command)) N2 SM Resource Release request is included if the PDU Session Release is initiated by the UE and if the UP connection of the PDU Session is active.

3b. If the PDU Session Release is initiated by the SMF or the PCF, the SMF invokes the Namf_Communication_N1N2MessageTransfer service operation (N1 SM container (PDU Session Release Command), skip indicator).

If the UP connection of the PDU Session is active, the SMF shall also include the N2 Resource Release request (PDU Session ID) in the Namf_Communication_N1N2MessageTransfer, to release the (R)AN resources associated with the PDU Session.

The "skip indicator" tells the AMF whether it may skip sending the N1 SM container to the UE (e.g. when the UE is in CM-IDLE state). SMF includes the "skip indicator" in the Namf_Communication_N1N2MessageTransfer except when the procedure is triggered to change PDU Session Anchor of a PDU Session with SSC mode 2.

If the UE is in CM-IDLE state and "skip indicator" is included in the Namf_Communication_ N1N2MessageTransfer service operation, the AMF acknowledges the step 3b by sending an Namf_Communication_ N1N2MessageTransfer Response message ("N1 SM Message Not Transferred") to SMF and steps 4 to 10 are skipped.

3c. If the PDU Session Release is initiated by the AMF in step 1c, i.e. the SMF received the Nsmf_PDUSession_ReleaseSMContext Request from the AMF, the SMF responds to the AMF with the Nsmf_PDUSession_ReleaseSMContext response.

The AMF and SMF shall remove all contexts (including the PDU Session ID) associated with the PDU Session which are indicated as released at the UE. AMF and SMF shall remove any event subscriptions on the AMF by the SMF as well. The steps 4 to 11 are skipped.

3d. If the PDU Session Release is initiated by the AMF in step 1f, i.e. the SMF received the Nsmf_PDUSession_UpdateSMContext Request from the AMF with a release indication to request the release of the PDU Session (e.g. due to a change of the set of network slices for a UE where a network slice instance is no longer available as described in TS 23.501 [2] clause 5.15.5.2.2), the SMF responds to the AMF with the Nsmf_PDUSession_UpdateSMContext Response which shall contain the N1 SM container (PDU Session Release Command) to release the PDU session at the UE.

If the UP connection of the PDU Session is active, the Nsmf_PDUSession_UpdateSMContext Response shall also include the N2 Resource Release request (PDU Session ID) to release the (R)AN resources associated with the PDU Session.

4. If the UE is in CM-IDLE state and "N1 SM delivery can be skipped" is not indicated, the AMF initiates the network triggered Service Request procedure to transmit the NAS message (PDU Session ID, N1 SM container) to the UE and the steps 6, 7 are skipped.

If the message received from the SMF in step 3 does not include N2 SM Resource Release request, the AMF transmits the NAS message (PDU Session ID, N1 SM container) to the UE and the steps 6, 7 are skipped.

[ . . . ].

5. When the (R)AN has received an N2 SM request to release the AN resources associated with the PDU Session it issues AN specific signalling exchange(s) with the UE to release the corresponding AN resources.

In the case of a NG-RAN, the NAS message is sent to the UE in an RRC message which may take place with the UE releasing the NG-RAN resources related to the PDU Session. If NG-RAN resources do not need to be released (i.e. the User Plane of the PDU Session is deactivated), the NAS message is sent to the UE in an RRC message which does not release the NG-RAN resources related to the PDU Session. During this procedure, the (R)AN sends any NAS message (N1 SM container (PDU Session Release Command)) received from the AMF in step 5.

6. [Conditional] If the (R)AN had received a N2 SM request to release the AN resources, the (R)AN acknowledges the N2 SM Resource Release Request by sending an N2 SM Resource Release Ack (User Location Information, Secondary RAT usage data) Message to the AMF.

If the PLMN has configured secondary RAT usage reporting, the NG-RAN node may provide RAN Usage Data Report.

7a. The AMF invokes the Nsmf_PDUSession_UpdateSMContext (N2 SM Resource Release Ack (Secondary RAT usage data), User Location Information) to the SMF.

7b. The SMF responds to the AMF with an Nsmf_PDUSession_UpdateSMContext response.

8. The UE acknowledges the PDU Session Release Command by sending a NAS message (PDU Session ID, N1 SM container (PDU Session Release Ack)) message over the (R)AN.

9. [Conditional] The (R)AN forwards the NAS message from the UE by sending a N2 NAS uplink transport (NAS message (PDU Session ID, N1 SM container (PDU Session Release Ack)), User Location Information) to the AMF.

10a. The AMF invokes the Nsmf_PDUSession_UpdateSMContext (N1 SM container (PDU Session Release Ack, User Location Information) to the SMF.

10b. The SMF responds to the AMF with an Nsmf_PDUSession_UpdateSMContext response.

Steps 8-10 may happen before steps 6-7.

11. If steps 3a, 3b or 3d were performed, the SMF waits until it has received replies to the N1 and N2 information provided in step 3, as needed.

The SMF invokes Nsmf_PDUSession_SMContextStatusNotify to notify AMF that the SM context for this PDU Session is released. The AMF releases the association between the SMF ID and the PDU Session ID, DNN, as well as S-NSSAI.

[ . . . ].

12. If Dynamic PCC applied to this session the SMF invokes an SM Policy Association Termination procedure as defined in clause 4.16.6 to delete the PDU Session.

SMF notifies any entity that has subscribed to User Location Information related with PDU Session change.

If it is the last PDU Session the SMF is handling for the UE for the associated (DNN, S-NSSAI), the SMF unsubscribes from Session Management Subscription data changes notification with the UDM by means of the Nudm_SDM_Unsubscribe (SUPI, DNN, S-NSSAI) service operation. The UDM may unsubscribe the subscription notification from UDR by Nudr_DM_Unsubscribe (SUPI, Subscription Data, Session Management Subscription data, DNN, S-NSSAI).

The SMF invokes the Nudm_UECM_Deregistration service operation including the DNN and the PDU Session Id. The UDM removes the association it had stored between the SMF identity and the associated DNN and PDU Session Id. The UDM may update this information by Nudr_DM_Update (SUPI, Subscription Data, UE context in SMF data).

Further, 3GPP TS 24.501 describes the NAS message for UE requested PDU session release as the following:

8.3.12 PDU Session Release Request 8.3.12.1 Message Definition

The PDU SESSION RELEASE REQUEST message is sent by the UE to the SMF to request a release of a PDU session. See table 8.3.12.1.1.

Message type: PDU SESSION RELEASE REQUEST
Significance: dual
Direction: UE to network

TABLE 8.3.12.1.1

| | | PDU SESSION RELEASE REQUEST message content | | | | |
|---|---|---|---|---|---|---|
| IEI | Information Element | Type/Reference | | Presence | Format | Length |
| | Extended protocol discriminator | Extended protocol discriminator 9.2 | | M | V | 1 |
| | PDU session ID | PDU session identity 9.4 | | M | V | 1 |
| | PTI | Procedure transaction identity 9.6 | | M | V | 1 |
| | PDU SESSION RELEASE REQUEST message identity | Message type 9.7 | | M | V | 1 |
| 59 | 5GSM cause | 5GSM cause 9.11.4.2 | | O | TV | 2 |

TABLE 8.3.12.1.1-continued

PDU SESSION RELEASE REQUEST message content

| IEI | Information Element | Type/Reference | Presence | Format | Length |
|---|---|---|---|---|---|
| 7B | Extended protocol configuration options | Extended protocol configuration options 9.11.4.6 | O | TLV-E | 4-65538 |

The PDU session release command is triggered by the network and currently described in 3GPP TS 24.501 as the following:
8.3.14 PDU Session Release Command
8.3.14.1 Message Definition
The PDU SESSION RELEASE COMMAND message is sent by the SMF to the UE to indicate a release of a PDU session. See table 8.3.14.1.1.
Message type:PDU SESSION RELEASE COMMAND
Significance: dual
Direction: network to UE

TABLE 8.3.14.1.1

PDU SESSION RELEASE COMMAND message content

| IEI | Information Element | Type/Reference | Presence | Format | Length |
|---|---|---|---|---|---|
|  | Extended protocol discriminator | Extended protocol discriminator 9.2 | M | V | 1 |
|  | PDU session ID | PDU session identity 9.4 | M | V | 1 |
|  | PTI | Procedure transaction identity 9.6 | M | V | 1 |
|  | PDU SESSION RELEASE COMMAND message identity | Message type 9.7 | M | V | 1 |
|  | 5GSM cause | 5GSM cause 9.11.4.2 | M | V | 1 |
| 37 | Back-off timer value | GPRS timer 3 9.11.2.5 | O | TLV | 3 |
| 78 | EAP message | EAP message 9.11.2.2 | O | TLV-E | 7-1503 |
| 61 | 5GSM congestion re-attempt indicator | 5GSM congestion re-attempt indicator 9.11.4.21 | O | TLV | 3 |
| 7B | Extended protocol configuration options | Extended protocol configuration options 9.11.4.6 | O | TLV-E | 4-65538 |

Packet Data Unit sessions established by the UE in the 5G Core network, where one or more PDU sessions may be established for the same DNN and or the same network slice. The invention may be summarized as follows:

If the same slice has one or multiple PDU sessions to the same DNN, the user can release all the PDU sessions at a time for the DNN or release a subset of the PDU sessions established for the same DNN. The UE would use one NAS message to indicate all the PDU sessions to be released for the DNN.

SUMMARY

Certain aspects of the present disclosure and their embodiments may provide solutions to the aforementioned or other challenges. The present disclosure proposes a mechanism in Fifth Generation System (5GS) implemented in Control Plane (CP) entity and a wireless device (e.g., a User Equipment, UE). A CP entity herein may also be referred to as a CP function.

A CP function can be implemented either as a network element on a dedicated hardware, such as a node, as a software instance running on a dedicated hardware, or as a virtualized function instantiated on an appropriate platform, e.g., on a cloud infrastructure.

There are, proposed herein, various embodiments or examples which address one or more of the issues disclosed herein. Certain embodiments may provide one or more of the following technical advantage(s).

The following summarizes the main aspects of the invention that enables a UE to release all the PDU sessions associated to a slice or multiple slices at a time.

The implementation examples of the invention described herein encompass methods and devices for managing the If the same slice has one or multiple sessions to multiple DNNs, the user can release all the PDU sessions established over all the DNNs or over a subset of DNNs. The UE can also release a subset of PDU sessions within one or more DNNs. Similarly, one NAS message is used to indicate release of all the corresponding PDU session for each DNN.

In addition, if a UE has established PDU sessions across many slices. It is proposed as well that a single NAS message be used to release all the PDU sessions for all the slices or a subset of the slices. The UE would send one NAS message over a default or first slice or selected slice and includes information to enable the receiving AMF in the default/first/selected slice to transfer the NAS PDU session release to the other AMFs serving the other slices (e.g., 5G GUTI or similar)

In addition, the UE may display to the user the PDU sessions established for each slice and optionally DNN. The user can select the PDU sessions to release, which would trigger the corresponding aggregate release of the selected PDU sessions.

Additionally, similar procedure as described above could be initiated by the network towards the UE.

According to one aspect, a method performed by a wireless device, which may be a User Equipment or an Internet of Things wireless device for bulk packet data unit sessions is provided. The method comprises the steps of determining that two or more Packet Data Unit, PDU, sessions associated to at least one Data network identified by a Data Network Name, DNN, or to at least one Single Network Slice Assisted Information, S-NSSAI, should be released and transmitting to a control entity of a core network, a Non-Access-Stratum, NAS, message indicating one of the at least one DNN or the at least one S-NSSAI for which the corresponding PDU sessions should be released all at once.

For example, the NAS message comprises the list of the PDU session identifiers to be release for the at least one DNN or the at least one S-NSSAI.

In another example, the step of transmitting the NAS message indicating one of the at least one DNN or the at least one S-NSSAI for which the PDU sessions should be released all at once is conditional to negotiating the use of the bulk PDU session release or DNN or S-NSSAI based release capability with the control entity of the core network.

In another example, the step of negotiating the use of the bulk PDU session release or DNN or S-NSSAI based release capability further comprises sending to the control entity in the control network a registration message or a PDU session establishment request message comprising a capability indication indicating the wireless device supports and/or enables bulk PDU session release or DNN based PDU session release or SNSSAI based PDU session release and receiving from the core network an indication of the core network support of the same feature, wherein the indication may indicate support or no support of the bulk PDU session release or DNN based PDU session release or SNSSAI based PDU session release.

According to another aspect, a method performed by a core network control plane entity for supporting bulk PDU session release is provided, the method comprises receiving from a wireless device a Non-Access Stratum, NAS, message indicating a single request to release Packet Data Unit, PDU, sessions, associated with at least one Data Network Name, DNN, or at least one Single Network Slice Network Assistance Information, determining one or more session management functions (SMFs) associated to the PDU sessions to be released and transmitting a request to the one or more SMFs to release the associated PDU sessions for the UE, and upon receiving at least one response message from one of the one or more SMFs or upon receiving a response message from all of the one or more SMFs, sending a response message to the wireless device indicating the result of the single request to release the PDU sessions associated with the at least one DNN or the at least one S-NSSAI.

In one example, the NAS message comprises the list of the PDU session identifiers to be release for the at least one DNN or the at least one S-NSSAI.

In another example, the method in the control plane entity comprises the step of receiving a capability indication indicating that the wireless device supports and/or enables bulk PDU session release or DNN based PDU session release or SNSSAI based PDU session release and indicating to the wireless device whether the capability is supported and enabled.

According to another aspect a wireless device and a node, server or distributed server system implementing the control plane entity are provided and perform the methods described herein.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 17 is a flowchart illustrating a method implemented in a communication system, in accordance with one embodiment.

FIG. 18 is a flowchart illustrating a method implemented in a communication system, in accordance with one embodiment.

DETAILED DESCRIPTION

Figure 1A:
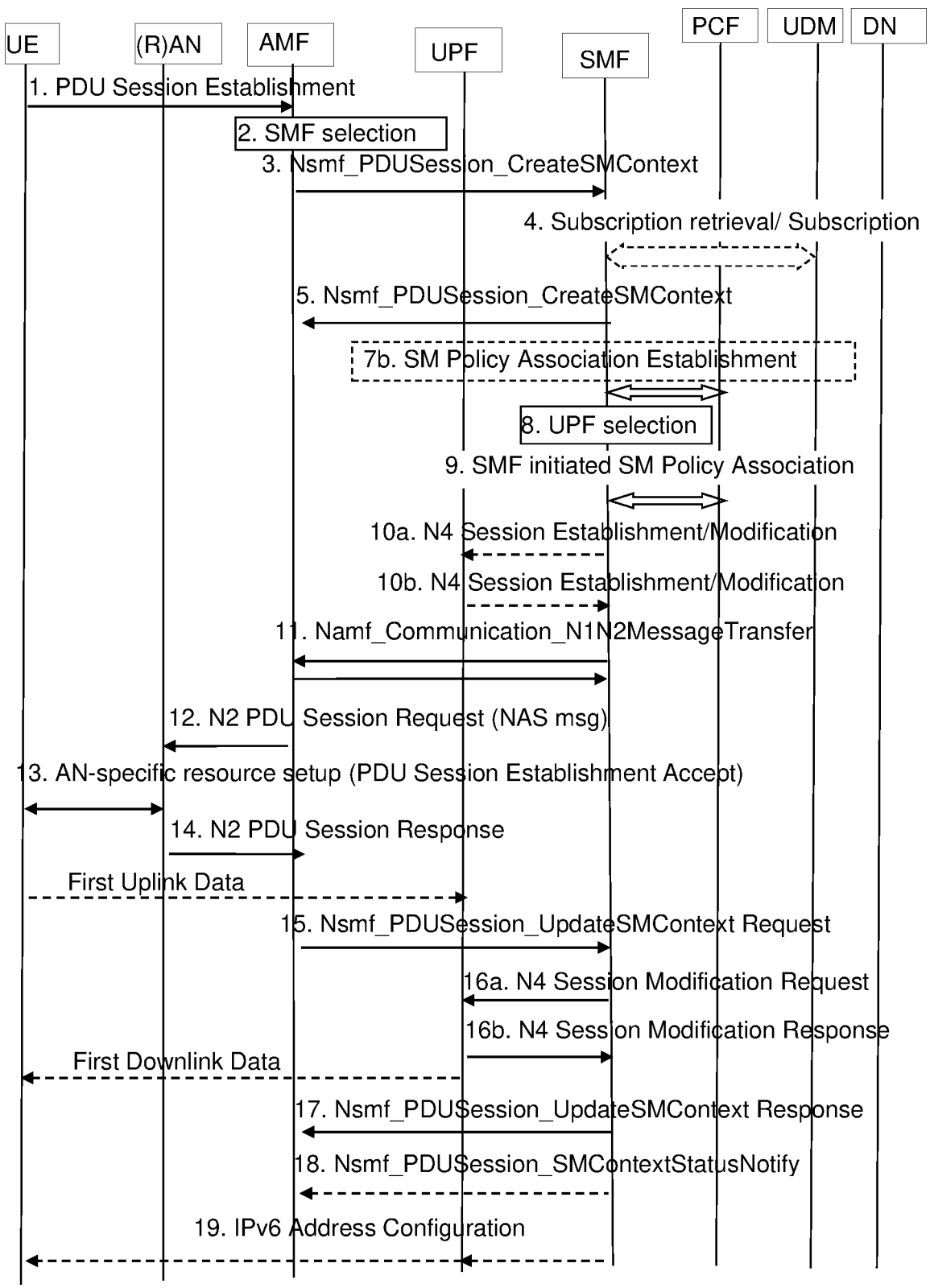
FIG. 1a (Prior Art) is a flow diagram illustrating a PDU session establishment procedure as currently described in 3GPP.
Figure 1B:
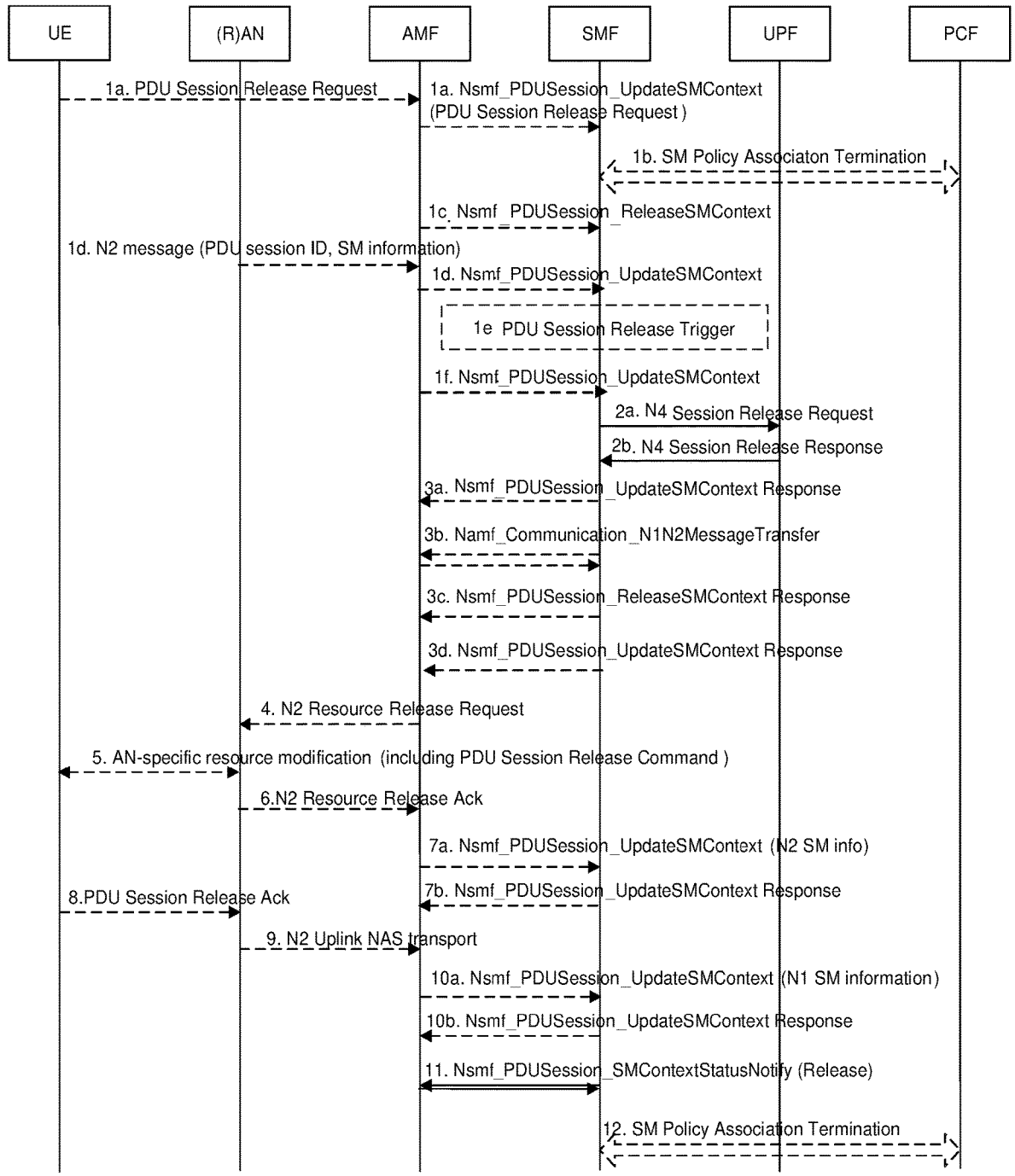
FIG. 1b (Prior Art) is a flow diagram illustrating a PDU session Release procedure as currently described in 3GPP.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Additional information may also be found in the document(s) provided in the Appendix.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network or any node that implements a core network function. Some examples of a core network node include, e.g., a Mobility Management Entity (MME), a Packet Data Network Gateway (PGW), a Service Capability Exposure Function (SCEF), a Home Subscriber Server (HSS), or the like. Some other examples of a core network node include a node implementing a Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

CP or UP Function: A function in a network, which has a defined functional behavior and defined interfaces.

Network slice also referred to as slice: 3GPP TS 23.501 defines network slice as the following: A Network Slice instance is defined within a PLMN and shall include the Core Network Control Plane and User Plane Network Functions and, in the serving PLMN, at least one of the following: the NG Radio Access Network and the N3IWF functions to the non-3GPP Access Network. The network may serve a single UE with one or more Network Slice instances simultaneously via a 5G-AN regardless of the access type(s) over which the UE is registered (i.e. 3GPP Access and/or N3GPP Access). The AMF instance serving the UE logically belongs to each of the Network Slice instances serving the UE, i.e. this AMF instance is common to the Network Slice instances serving a UE. The selection of the set of Network Slice instances for a UE is triggered by the first contacted AMF in a Registration procedure normally by interacting with the NSSF and can lead to a change of AMF.

Note that a network function can be implemented either as a network element on a dedicated hardware, as a software instance running on a dedicated hardware, or as a virtualised function instantiated on an appropriate platform, e.g., on a cloud infrastructure.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 2:
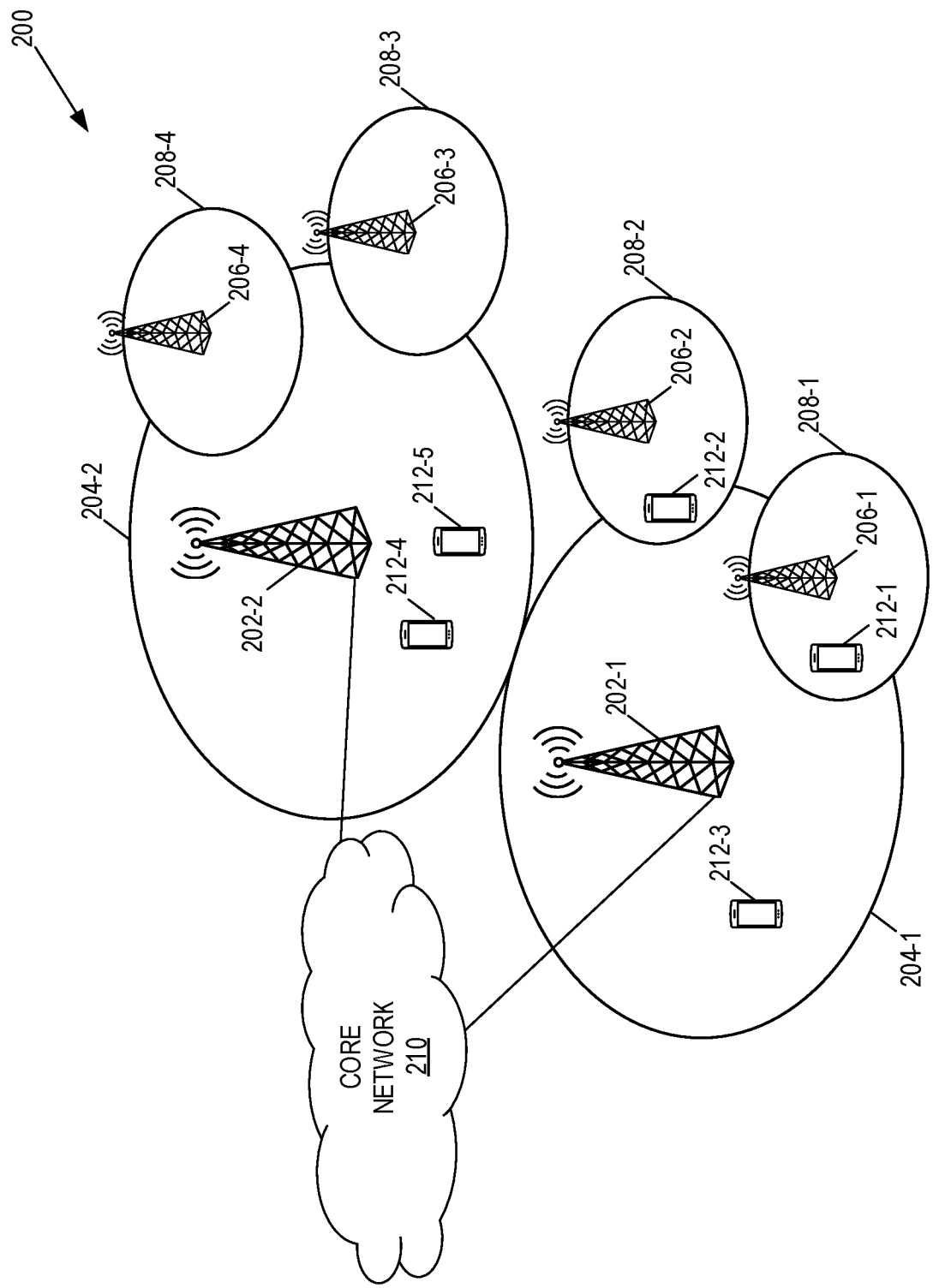
FIG. 2 is a functional block diagram illustrating a cellular telecommunication system configured according to one embodiment of the present disclosure.

FIG. 2 illustrates one example of a cellular communications system 200 in which embodiments of the present disclosure may be implemented. In the embodiments described herein, the cellular communications system 200 is a 5G system (5GS) including a NR Radio Access Network (RAN) or an Evolved Packet System (EPS) including a LTE RAN. In this example, the RAN includes base stations 202-1 and 202-2, which in LTE are referred to as eNBs and in 5G NR are referred to as gNBs, controlling corresponding (macro) cells 204-1 and 204-2. The base stations 202-1 and 202-2 are generally referred to herein collectively as base stations 202 and individually as base station 202. Likewise, the (macro) cells 204-1 and 204-2 are generally referred to herein collectively as (macro) cells 204 and individually as (macro) cell 204. The RAN may also include a number of low power nodes 206-1 through 206-4 controlling corresponding small cells 208-1 through 208-4. The low power nodes 206-1 through 206-4 can be small base stations (such as pico or femto base stations) or Remote Radio Heads (RRHs), or the like. Notably, while not illustrated, one or more of the small cells 208-1 through 208-4 may alternatively be provided by the base stations 202. The low power nodes 206-1 through 206-4 are generally referred to herein collectively as low power nodes 206 and individually as low power node 206. Likewise, the small cells 208-1 through 208-4 are generally referred to herein collectively as small cells 208 and individually as small cell 208. The cellular communications system 200 also includes a core network 210, which in the 5GS is referred to as the 5G core (5GC). The base stations 202 (and optionally the low power nodes 206) are connected to the core network 210.

The base stations 202 and the low power nodes 206 provide service to wireless devices 212-1 through 212-5 in the corresponding cells 204 and 208. The wireless devices 212-1 through 212-5 are generally referred to herein collectively as wireless devices 212 and individually as wireless device 212. The wireless devices 212 are also sometimes referred to herein as UEs.

Figure 3:
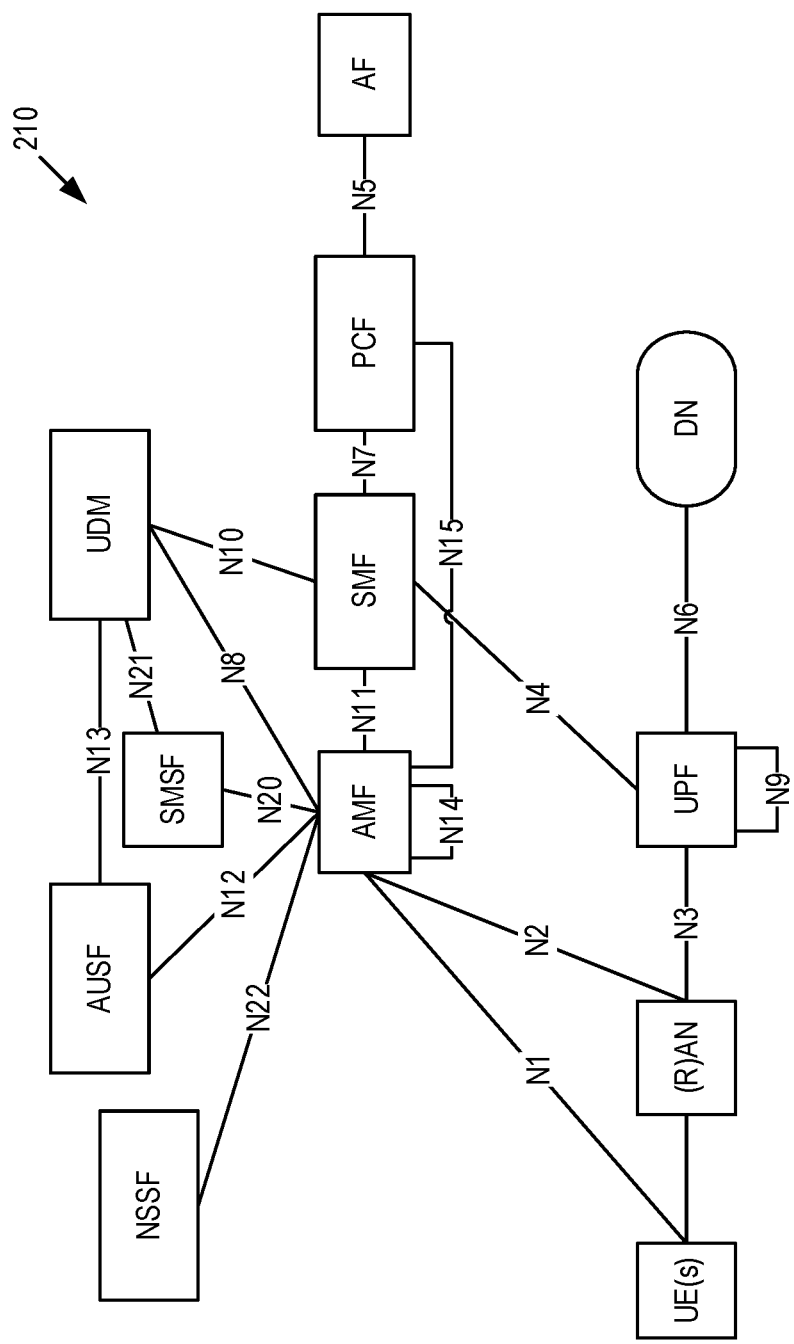
FIG. 3 is a functional block diagram illustrating a point reference view of the 5th Generation Core Network used to describe embodiments of the present disclosure.

FIG. 3 illustrates a wireless communication system represented as a 5G network architecture composed of core Network Functions (NFs), where interaction between any two NFs is represented by a point-to-point reference point/interface. FIG. 3 can be viewed as one particular implementation of the system 200 of FIG. 2.

Seen from the access side, the 5G network architecture shown in FIG. 3 comprises a plurality of User Equipment (UEs) connected to either a Radio Access Network (RAN) or an Access Network (AN) as well as an Access and Mobility Management Function (AMF). Typically, the (R)AN comprises base stations, e.g., such as evolved Node Bs (eNBs) or NR base stations (gNBs) or similar. Seen from the core network side, the 5G core NFs shown in FIG. 3 include a Network Slice Selection Function (NSSF), an Authentication Server Function (AUSF), a Unified Data Management (UDM), an AMF, an SMS Function (SMSF), a Session Management Function (SMF), a Policy Control Function (PCF), and an Application Function (AF). When a Packet Data session is established, the procedure to establish one PDU session Reference point representations of the 5G network architecture are used to develop detailed call flows in the normative standardization. The N1 reference point is defined to carry signaling between the UE and AMF. The reference points for connecting between the AN and AMF and between the AN and UPF are defined as N2 and N3, respectively. There is a reference point, N11, between the AMF and SMF, which implies that the SMF is at least partly controlled by the AMF. N4 is used by the SMF and UPF so that the UPF can be set using the control signal generated by the SMF, and the UPF can report its state to the SMF. N9 is the reference point for the connection between different UPFs, and N14 is the reference point connecting between different AMFs, respectively. N15 and N7 are defined since the PCF applies policy to the AMF and SMF, respectively. N12 is required for the AMF to perform authentication of the UE. N8 and N10 are defined because the subscription data of the UE is required for the AMF and SMF. N20 is a reference point for SMS transfer between AMF and SMSF, and N21 is a reference point for SMS Function address registration management and SMS Management Subscription data retrieval between SMSF and UDM.

The 5G core network aims at separating user plane and control plane. The user plane carries user traffic while the control plane carries signaling in the network. In FIG. 3, the UPF is in the user plane and all other NFs, i.e., the AMF, SMF, PCF, SMSF, AF, AUSF, and UDM, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF and SMF are independent functions in the control plane. Separated AMF and SMF allow independent evolution and scaling. Other control plane functions like the PCF and AUSF can be separated as shown in FIG. 3. Modularized function design enables the 5G core network to support various services flexibly.

Each NF interacts with another NF directly or indirectly and the architecture in FIG. 3 illustrates the NF interactions. When interacting indirectly, an intermediate function (such as an SCP) is used to route messages from one NF to another NF. In the control plane, a set of interactions between two NFs is defined as service so that its reuse is possible. This service enables support for modularity. The user plane supports interactions such as forwarding operations between different UPFs.

Figure 4:
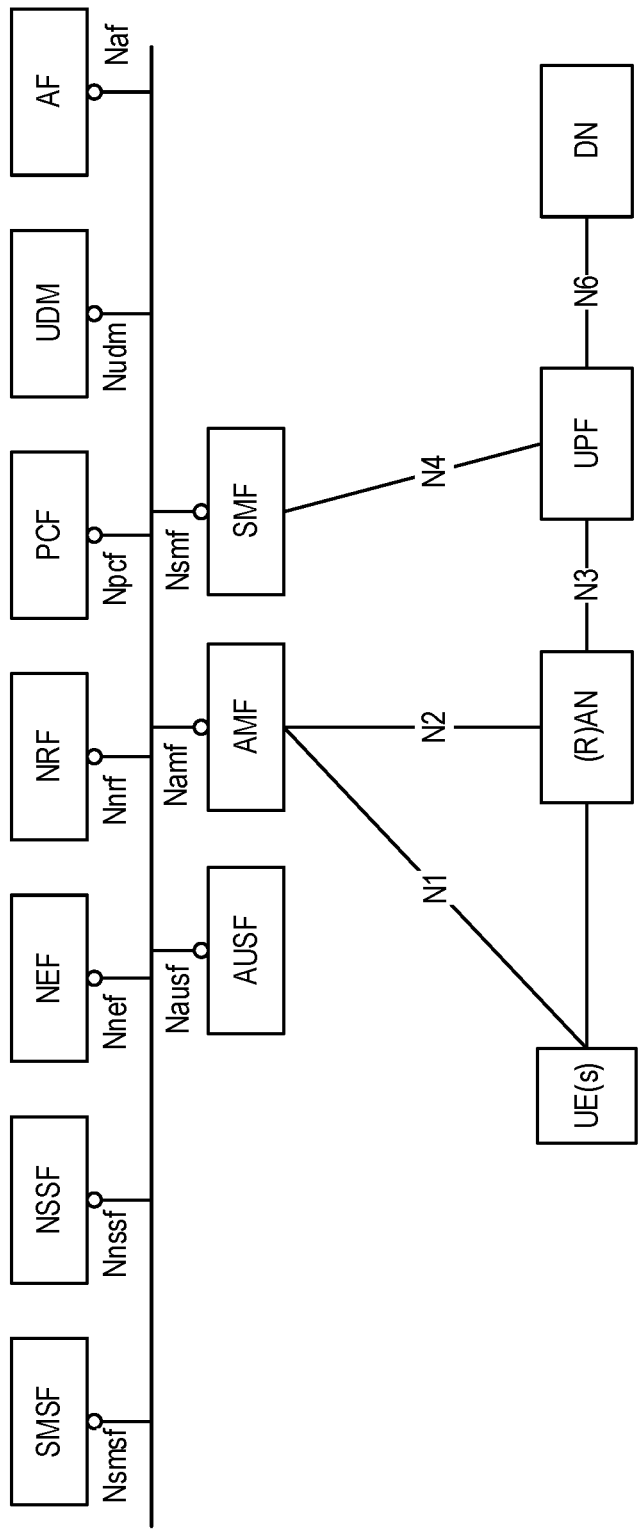
FIG. 4 is a functional block diagram illustrating a Service based architecture of a 5th Generation Core Network according to one embodiment of the present disclosure.

FIG. 4 illustrates a 5G network architecture using service-based interfaces between the NFs in the control plane, instead of the point-to-point reference points/interfaces used in the 5G network architecture of FIG. 3. However, the NFs described above with reference to FIG. 3 correspond to the NFs shown in FIG. 4. The service(s) etc. that a NF provides to other authorized NFs can be exposed to the authorized NFs through the service-based interface. In FIG. 4 the service based interfaces are indicated by the letter "N" followed by the name of the NF, e.g., Namf for the service based interface of the AMF and Nsmf for the service based interface of the SMF, Nsmsf is the Service-based interface exhibited by SMSF etc. The Network Exposure Function (NEF) and the Network Function (NF) Repository Function (NRF) in FIG. 4 are not shown in FIG. 3 discussed above. However, it should be clarified that all NFs depicted in FIG. 3 can interact with the NEF and the NRF of FIG. 4 as necessary, though not explicitly indicated in FIG. 3.

Some properties of the NFs shown in FIGS. 3 and 4 may be described in the following manner. The AMF provides UE-based authentication, authorization, mobility management, etc. A UE even using multiple access technologies is basically connected to a single AMF because the AMF is independent of the access technologies. The SMSF supports functionality to support SMS over NAS, such as SMS management subscription data checking and conducting SMS delivery to and from the UE, relay the Short Message (SM) from UE toward SMS GW/SMS-Router and relay the SM from SMS GW/SMS-Router toward the UE, generate SMS related CDR and Interacts with AMF and SMS GW for notification procedure that the UE is unavailable for SMS transfer (i.e., notifies SMS GW to inform UDM when UE is unavailable for SMS).

The SMF is responsible for session management and allocates Internet Protocol (IP) addresses to UEs. It also selects and controls the UPF for data transfer over a PDU session. If a UE has multiple PDU sessions, different SMFs may be allocated to each session to manage them individually and possibly provide different functionalities per PDU session. The AF provides information on the packet flow to the PCF responsible for policy control in order to support Quality of Service (QoS). Based on the information, the PCF determines policies about mobility and session management to make the AMF and SMF operate properly. The AUSF supports authentication function for UEs or similar and thus stores data for authentication of UEs or similar while the UDM stores subscription data of the UE. The Data Network (DN), not part of the 5G core network, provides Internet access or operator services and similar.

An NF or network entity as used herein may be implemented either as a network element on a dedicated hardware, as a software instance running on a dedicated hardware, or as a virtualized function instantiated on an appropriate platform, e.g., a cloud infrastructure.

The present disclosure proposes a mechanism for bulk release of PDU sessions per DNN with a network slice or bulk release of PDU sessions for one or more network slices. Both UE initiated and network initiated bulk PDU session release are described.

Bulk PDU Session Release within One DNN

Figure 5:
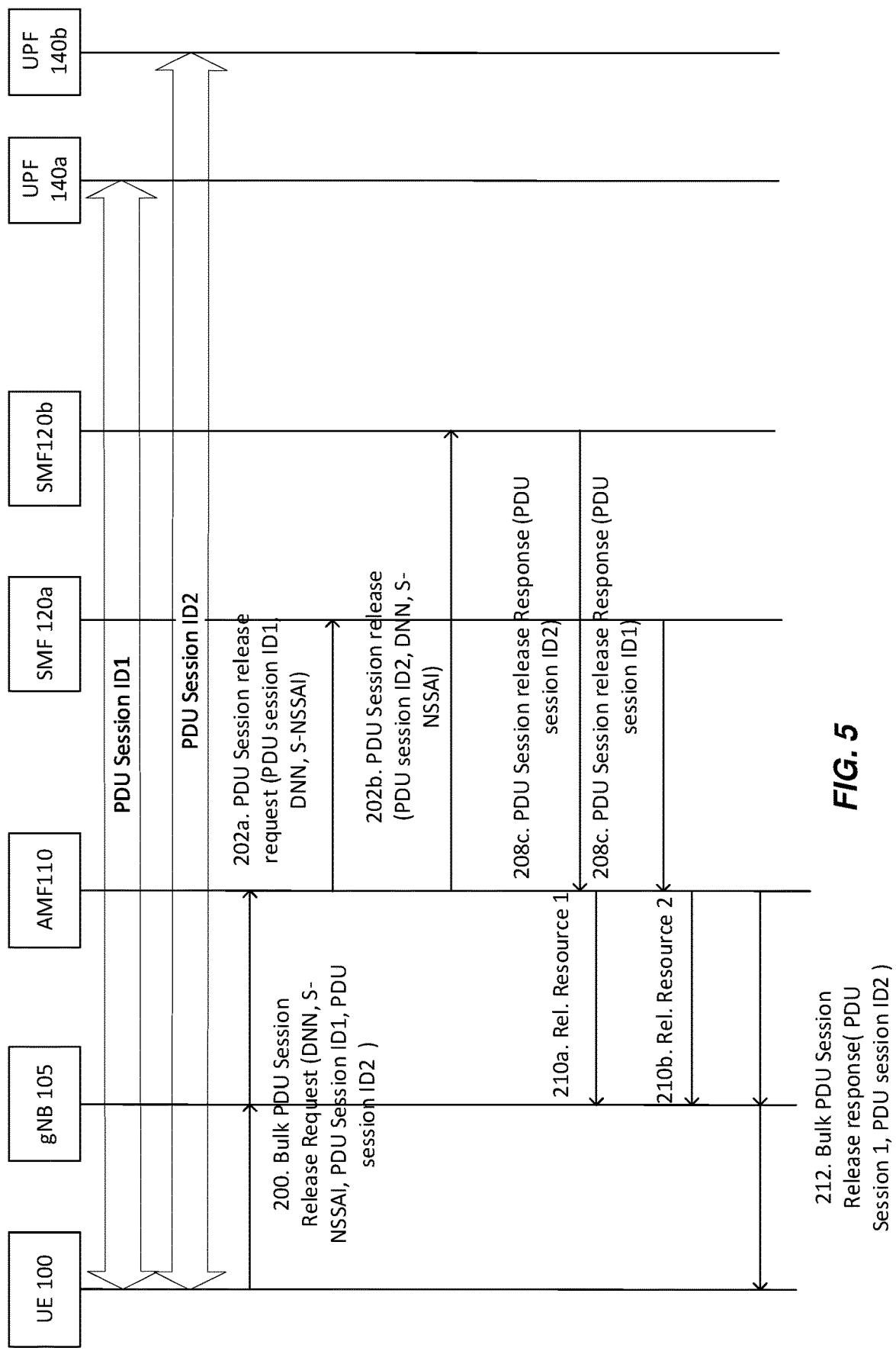
FIG. 5 is a flow diagram illustrating a PDU session release procedure according to embodiments of the present disclosure.

FIG. 5 illustrates an example of a UE initiated bulk PDU session release for two or more PDU sessions within one DNN.

In one example the UE has indicated to the network that it supports the capability of bulk PDU session release, i.e., DNN based PDU session release or slice based PDU session (S-NSSAI) based. If the network indicated that bulk PDU session release is supported, then the UE can use the feature. The capability negotiation may be negotiated at UE registration with the network, first PDU session establishment for the DNN or slice, or via other suitable procedure.

Back to FIG. 5, the UE has 2 or more PDU sessions established to one DNN for the S-NSSAI. In the Figure, 2 PDU sessions to 2 different UPFs. The UE may also have 2 PDU sessions to one UPF. The UE determines that a bulk PDU session release should be sent to the AMF. The bulk PDU session release is initiated if the User selects to close two or more applications that are using the two PDU sessions. The User may also have an option on the phone to close all the applications associated to a DNN.

The UE 100 at step 200, sends a Bulk PDU Session Release Request or any suitable Session Management message that indicates more than one PDU session should be released at once for the same DNN. The Bulk PDU Session Release Request may be one Session management message transported over a NAS message to the AMF and which may include either all the PDU session Identifiers (PDU session ID1, PDU session ID2) established with the same DNN and that it wants to release at once, or it may just indicate the DNN. In addition, it may include the S-NSSAI associated with the PDU sessions.

Another example of signaling to the network bulk PDU session release is to piggy back in a NAS message as many Session management container message as the number of PDU sessions it wants to release at once, but that may not be efficient as it leads to sending larger messages over the air interface. In this case, the NAS message includes two Session Management (SM) containers each containing a PDU Session Release message for one PDU session, one for PDU session ID1 and another SM container for PDU Session ID2. The NAS message that transports the SM container messages may indicate the DNN and may also indicate the S-NSSAI.

When the AMF receives the NAS message containing bulk PDU session release indication in either form (as explained above) it determines the SMFs affected by the release and instruct each SMF at step 202a and step 202b to release the PDU session. If only the DNN is indicated, the AMF can determine the PDU sessions established for the UE on that DNN and instructs the respective SMFs accordingly.

When the AMF receives one or all of the PDU session release response messages from each SMFs at step 208a and 208b, the AMF can send a NAS response message to the UE indicating Bulk PDU session release is completed, step 212b. The AMF, at step 201a, 210b instructs the AN or gNB that the resources should be released for the PDU session. The AMF may also wait for all the PDU session release responses to be received from the SMFs and provides a bulk release to the gNB (One message instead of two).

In another embodiment, the bulk PDU session release within one DNN is initiated by the network towards the UE.

Not shown in the figure, if the network wants to release all the PDU sessions for the same DNN, the AMF can instruct the UE to release all the PDU sessions for a DNN.

The AMF can just indicate bulk session release for a DNN indicating just the DNN. Upon receiving the message, the UE releases all the PDU sessions associated with the DNN.
Bulk PDU Session Release for Different DNNs within One Slice In this scenario, the UE indicates bulk PDU session release for PDU sessions established with two or more DNNs associated to the same network slice.

Similar to the above call flow, however the bulk PDU session release for different DNNs within one S-NSSAI would include together with the UE identity (temporary or permanent)
 1. the list of DNNs for which the corresponding PDU sessions must be released. Alternatively, the message may include the list of PDU session IDs associated with each DNN and that should be released, both the DNNs and the corresponding PDU sessions IDs would be included. In addition, the slice identifier would be included as well if the DNNs are unique within a slice.
 2. When all the PDU sessions for all the DNNs associated to the same slice are to be released in a bulk at once, an example implementation would be to send a bulk PDU session release message comprising only the S-NSSAI. When the network, AMF, receives the message, it determines from the stored context for the UE, all the PDU session IDs associated with the S-NSSAI for the UE, then instructs each of the SMSFs to release the corresponding PDU sessions.

In another embodiment the bulk PDU session release with different DNNs associated to the same network slice is initiated by the network towards the UE. In this case, the AMF obtains an instruction from SMF or PCF or UDM that the PDU sessions related to at least 2 DNNs should be released. The AMF sends a bulk PDU session release indicating the DNNs for which the PDU sessions should be released. Alternatively, the bulk PDU session release indicates only the S-NSSAI when all the PDU sessions for that slice for that UE should be released. The UE determines the PDU sessions associated with the DNNs or the S-NSSAI and release the corresponding PDU sessions. The UE then sends a response back to the AMF.
Bulk PDU Session Release for Multiple Slices In this scenario, the UE indicates bulk PDU session release for PDU sessions established within two or more S-NSSAIs established by the UE.

Similar to the above call flow, when the bulk PDU session release for all PDU sessions associated to two different network slices or more would include the list of S-NSSAIs over which the PDU sessions are established. Alternatively, the message may include the list of all PDU session IDs that should be released within one slice, in which case the corresponding DNNs for the PDU sessions may also be included. One example for perhaps adding PDU session IDs in the message would be if a subset of PDU sessions per slice need to be released. Else, it may be sufficient to only indicate the S-NSSI together with the UE identity (temporary or permanent).

In another embodiment the bulk PDU session release to release all or a subset of PDU sessions associated to different network slides is initiated by the network towards the UE. In this case, the AMF obtains an instruction from SMF or PCF or UDM that the PDU sessions related to at least 2 network slices associated with 2 S-NSSAIs should be released. The AMF sends a bulk PDU session release indicating only the S-NSSAIs for which the PDU sessions should be released. Alternatively, the bulk PDU session release indicates for each S-NSSAI a subset of the PDU sessions that UE should release. The UE determines the PDU sessions associated with the network slices identified by the S-NSSAI and release the corresponding PDU sessions. The UE then sends a response back to the AMF.

Figure 6:
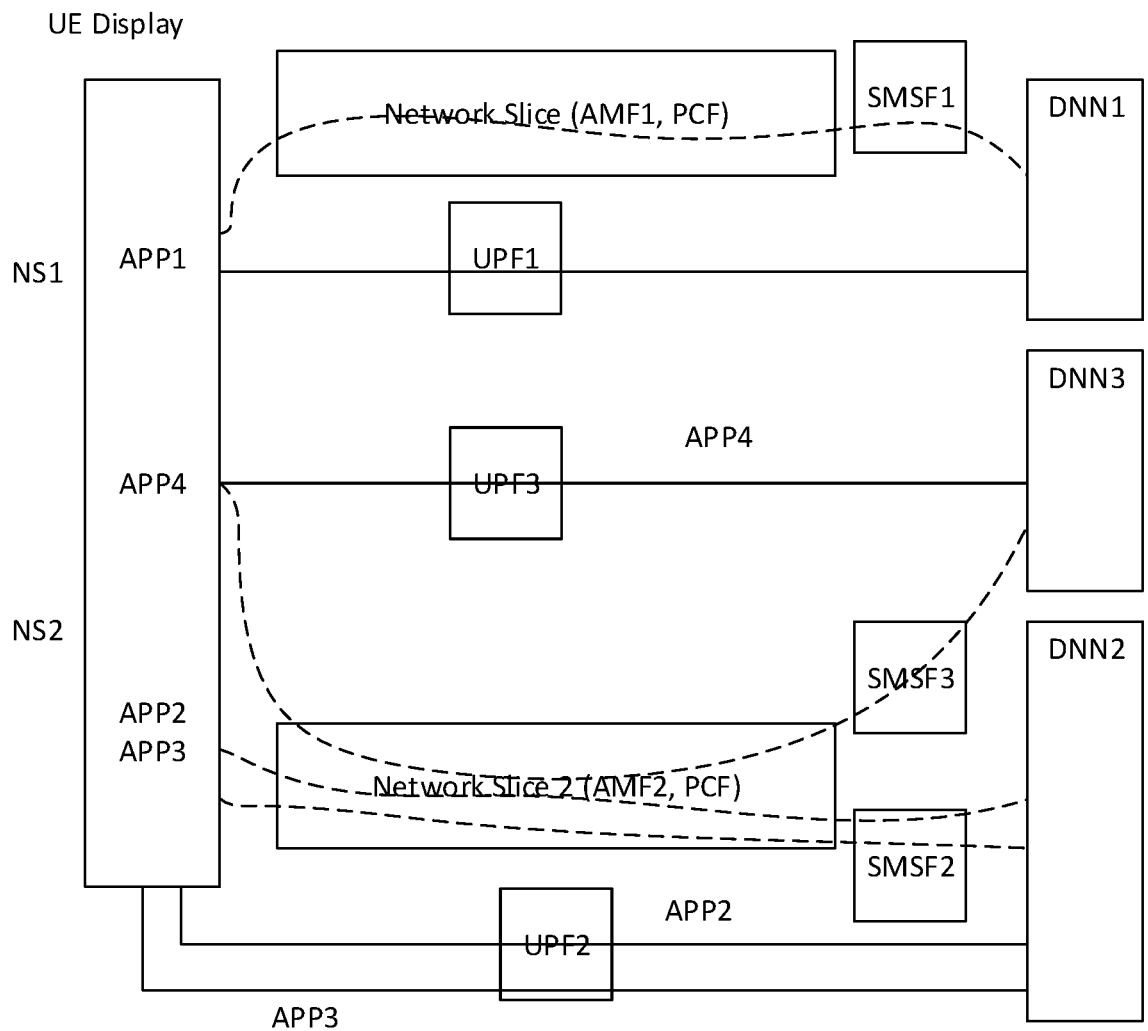
FIG. 6 is an illustration of the PDU sessions association to Network slices according to one embodiment of the present disclosure.
Figure 7:
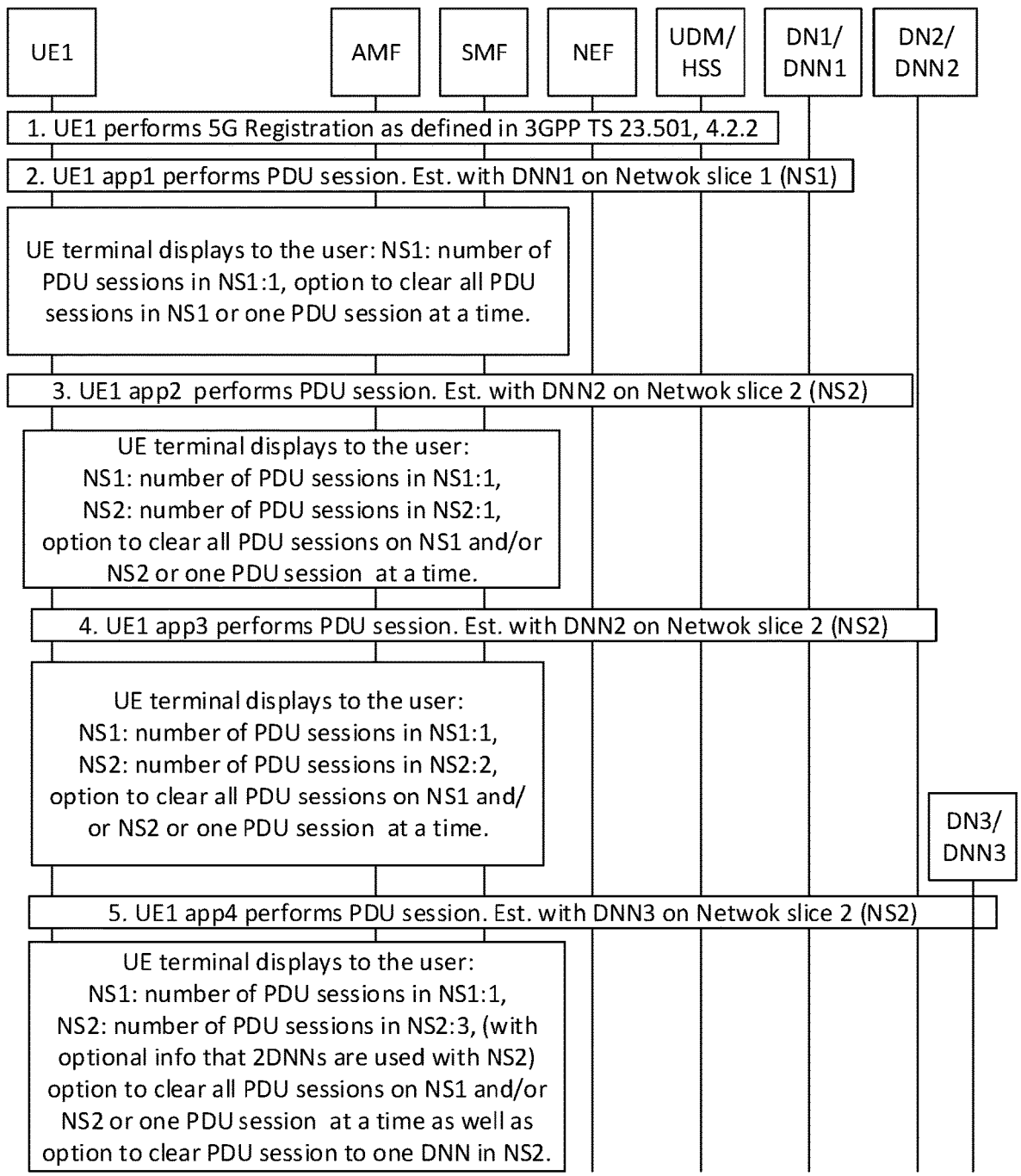
FIG. 7 illustrates PDU sessions establishment for a network slice and corresponding terminal/UE display in accordance with some embodiments.

FIG. 6 and FIG. 7 illustrate example application of the invention as described herein. FIG. 6 shows the PDU sessions established by the wireless device/UE on two network slices (NS1 and NS2). A wireless device/UE has 4 applications running, 3 applications are sharing the same network slice, NS2 (S-NSSAI2) but towards different Data Network (DN) identified by DNN2 and DNN3. App4 uses a different SMF3 then the one used by app2 and app3 communicate with the same DNN3. App2, and app3 could share the same IP address but a different socket/port. App4 has a different IP address since it has its own PDU session via SMF3. Finally, app2 uses a PDU session over NS1 (S-NSSAI1) where the PDU session is connected to DNN1.

As illustrated in FIG. 7 the UE can display the necessary information to enable the user to make the proper choice (shown in the text boxes) for how to manage clearing PDU sessions, i.e., per network slice, per DNN, etc. hence triggering a bulk release of the associated PDU sessions If the same slice has one or multiple sessions to the same DNN, the user can clear all sessions or one at a time If the same slice has one or multiple sessions to multiple DNNs, the user can clear all sessions regardless of the number of DNNs, all sessions belonging to the same DNN, or an appropriate combination In addition, to the above if the UE wants to establish a hot spot, he will be provided with the slices that can be used for that purpose, and he can choose the slice he wants, or he can choose hot spot and will be prompted to choose a slice if more than one slice can be used. The user may be provided with additional information beside the slice such as charging related information or performance comparison if more than one slice can be used to enable a choice.

In addition, the user, can be provided with the ability to close one application at a time, or to shutdown an entire network slice impacting all applications using that slice. Hence the display should show which applications uses what slice.

The term network slice may not be used for the UE display although other synonymous terms, that are more user-friendly may be more appropriate as long as they convey the same information Details of Possible Use Cases:

Use Case 1: User Shuts Down a Slice at UE

Referring to FIG. 6 and FIG. 7, the UE supports the capability for a user to shut down (or turn ON/OFF) his network signals which automatically shutdowns all network services supported by his telecom operator.

Network services available at the UE would come as part of one or more network slices, and user will therefore have multiple slices available at his UE. Each slice is a logical network, supporting one or more network services. A user may like to turn OFF select slices at UE, stop services supported by select slices, or troubleshoot slice specific network signal reception at his UE for some time duration as per use cases. A user should therefore be provided with choice to shut down one or more slices at his UE. But today it is not possible. The embodiments or examples described herein show how that feature can be implemented. If the user selects to shut down all network services that may be provided on multiple slices and or single network slice with multiple DNN, the UE would trigger one single bulk PDU session release that would include the S-NSSAIs used for the PDU sessions and/or the multiple DNNs. This provides an optimization in the signaling and could help in preventing unsynchronized PDU states as a single message is used to release all PDU sessions, instead of individual PDU session release associated to a PDU session ID.

A new option at the UE (just like highlighted options today (in screenshots of FIG. 7a)) is required, to allow a user to shut down (or turn OFF) select slice (out of multiple slices) at UE.

Use Case 2: User Chosen Slice(s) for Turning ON/OFF the Mobile Hotspot

Using FIG. 6 and FIG. 7, a user can select a slice for a hotspot on his UE while turning ON/OFF the hotspot at UE. Allowing user to choose which network slice he/she wants to use for making a mobile a hotspot has some interesting applications.

In 5G, multiple network slices are expected to be available at UE. But in presence of multiple slices, wherein each slice representing a logical network, a user should be provided with a capability at UE to select a slice (out of multiple slices) to be used for hotspot at a time and place as per his choice.

Figure 8:
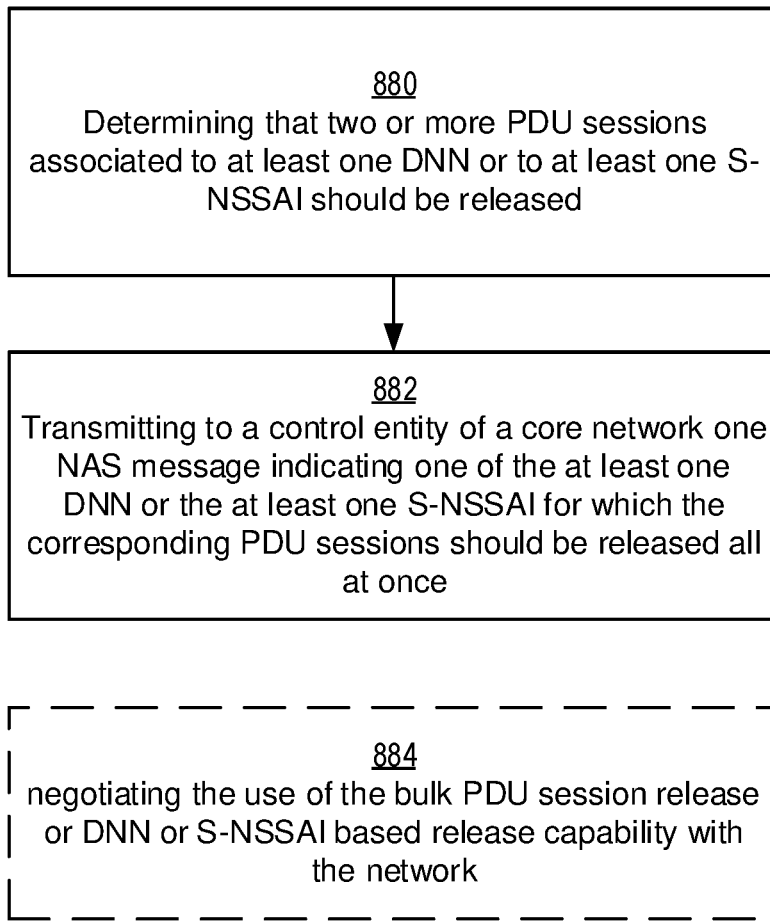
FIG. 8 is a flow chart for the wireless device (example UE) according to embodiments of the present disclosure.

FIG. 8 illustrates a method in a UE for handling bulk PDU sessions release in accordance with examples implementations as described herein.

Step 880: the UE executes the step of determining that two or more PDU sessions associated to at least one DNN or to at least one S-NSSAI should be released. In other words, either all the PDU sessions associated to one or more DNN which may belong to one network slice identified by an S-NSSAI or to different network slices. The UE may also disconnect all PDU sessions associated to a network slice or more than one network slice at a time, such as turning off a hotspot if the hotspot is associated to one or two network slices.

Step 882: the UE then executes the step of transmitting to a control entity of a core network (such an AMF) one NAS message indicating that all the PDU sessions for one of the at least one DNN or the at least one S-NSSAI for which the corresponding PDU sessions should be released all at once. The message comprises either the DNN, which is an indication that all the PDU sessions for the UE established with that DNN must be released. If PDU sessions for two DNNs should be released as an example, the UE then should include the two DNNs identifier for the UE. The UE may indicate the list of PDU session IDs to release for each DNN. The S-NSSAI associated with the DNN(s) is included. If the DNNs are used with different S-NSSAIs, the bulk PDU session release would include a list of S-NSSAI for example and for each S-NSSAI a list of DNNs to release.

If the UE wants to release all the PDU sessions of a network slice, it may or may not include the DNNs for the S-NSSAI. It may also include the PDU session Identifiers for each one of the PDU sessions to release. It may be sufficient to only indicate the S-NSSAI for which the PDU sessions should be released at once.

The NAS message is more efficient than piggy bagging individual PDU session release messages for each PDU session which is a much larger message, hence use more radio resources.

Step 884, which if it occurs should occur prior to step 880. The UE execute the steps of negotiating the use of the bulk PDU session release or DNN or S-NSSAI based release capability with the network and where negotiating the use of the bulk PDU session release or DNN or S-NSSAI based release capability comprises the UE sending to the control entity in the control network a capability indication indicating the wireless device supports and/or enables bulk PDU session release or DNN based PDU session release or SNSSAI based PDU session release and receiving from the core network an indication of the Core network support of the same feature, wherein the indication may indicate support or no support of the bulk PDU session release or DNN based PDU session release or SNSSAI based PDU session release. The UE may negotiate the use of the feature during the registration procedure with the core network or when establishing the first PDU session for the DNN or the S-NSSAI. The capability may be further specified as bulk PDU session release per DNN and/or S-NSSAI.

Figure 9:
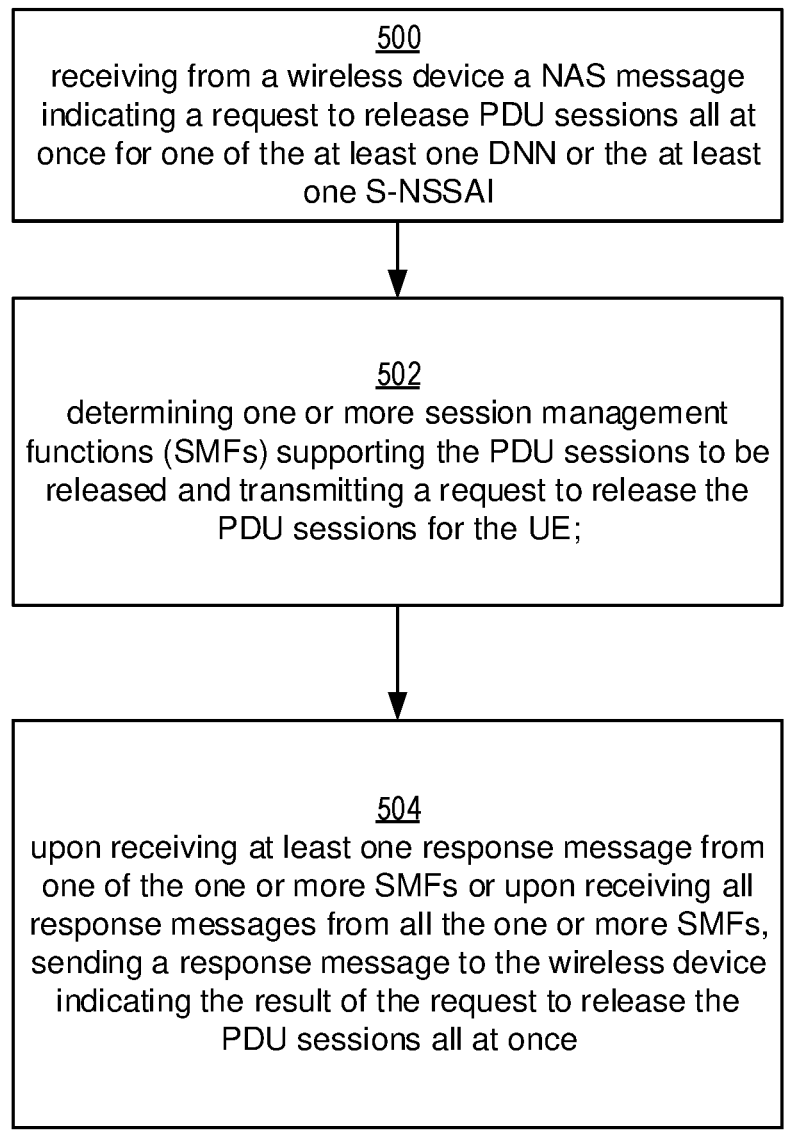
FIG. 9 is a flow chart for the CP entity, AMF, according to embodiments of the present disclosure.

FIG. 9 illustrates a method in a control plane entity such as an AMF in 5G for handling bulk PDU session release or disconnection in accordance with examples implementations as described herein.

Step 500: The control plane entity executes the step of receiving from a wireless device a NAS message indicating a request to release PDU sessions all at once for one of the at least one DNN or the at least one S-NSSAI. The request may include the PDU session IDs for the PDU session to release Step 502: determining one or more session management functions (SMFs) supporting the PDU sessions to be released and transmitting a request to release the PDU sessions for the UE to the one or more SMFs identified. If the PDU session IDs are included in the NAS message, the AMF determines from the PDU session IDs the corresponding one or more SMFs with which the context should be released. If only one or more DNN or one or more S-NSSAI is included, the AMF determines the corresponding PDU sessions established for the UE for the DNN(s) or for the S-NSSAI and sends a PDU session release, which may be a request to release the context in the corresponding SMFs. The control plane entity (AMF) would have obtained the PDU session IDs for the DNN and/or S-NSSAI at the time the PDU sessions are established.

Step 504: upon receiving at least one response message from one of the one or more SMFs or upon receiving all response messages from all the one or more SMFs, where the response indicates the context for the PDU session is released the control plane entity executes the step of sending a response message to the wireless device indicating the result of the request to release the PDU sessions all at once for one of the at least one DNN or the at least one S-NSSAI. If it has received an error message from one or more of the SMFs, the control plane entity (AMF) still indicates to the UE the result of the release without necessarily conveying the error that was received from at least one SMF.

Prior to receiving the bulk PDU session release, the CP entity or AMF in 5G negotiates with the UE the support and use of the feature. If the UE signals at UE registration/attach or PDU session establishment, an indication that it supports the capability of bulk PDU session release or DNN based PDU session release or SNSSAI based PDU session release, the CP entity (AMF) determines if it supports the same feature and responds to the UE/wireless device indicating whether the feature is supported and/or enabled.

Figure 10:
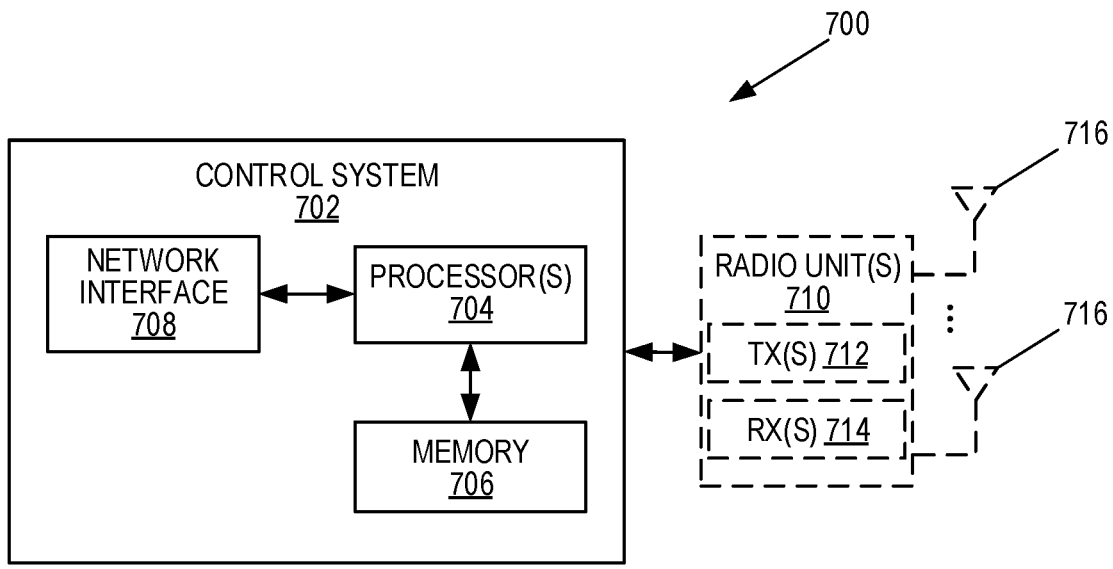
FIG. 10 is a schematic block diagram of a network node, according to one embodiment of the present disclosure.

FIG. 10 is a schematic block diagram of a network node 700 according to some embodiments of the present disclosure. The network node 700 may be, for example, a radio access node, such as a base station 202 or 206, or a core network node, such as those illustrated in FIGS. 3 and 4. As illustrated, the network node 700 includes a control system 702 that includes one or more processors 704 (e.g., Central Processing Units (CPUs), Application Specific Integrated Circuits (ASICs), Field Programmable Gate Arrays (FPGAs), and/or the like), memory 706, and a network interface 708. The one or more processors 704 are also referred to herein as processing circuitry.

In addition, if the network node 700 is a radio access node, for example, it may include one or more radio units 710 that each includes one or more transmitters 712 and one or more receivers 714 coupled to one or more antennas 716. The radio units 710 may be referred to or be part of radio interface circuitry. In some embodiments, the radio unit(s) 710 is external to the control system 702 and connected to the control system 702 via, e.g., a wired connection (e.g., an optical cable). However, in some other embodiments, the radio unit(s) 710 and potentially the antenna(s) 716 are integrated together with the control system 702. The one or more processors 704 operate to provide one or more functions of a network node 700 as described herein. In some embodiments, the function(s) are implemented in software that is stored, e.g., in the memory 706 and executed by the one or more processors 704.

Figure 11:
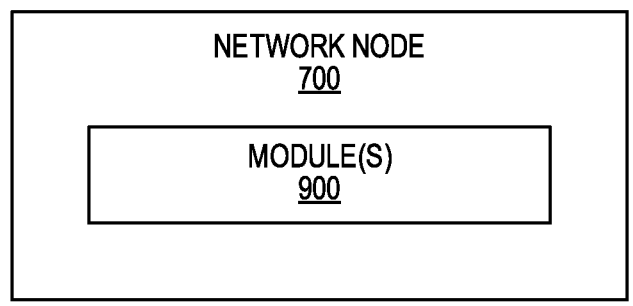
FIG. 11 is a schematic block diagram of a network node, according to another embodiment of the present disclosure.

FIG. 11 is a schematic block diagram that illustrates a virtualized embodiment of the network node 700 according to some embodiments of the present disclosure. This discussion is equally applicable to other types of network nodes. Further, other types of network nodes may have similar virtualized architectures.

As used herein, a "virtualized" radio access node is an implementation of the network node 700 in which at least a portion of the functionality of the network node 700 is implemented as a virtual component(s) (e.g., via a virtual machine(s) executing on a physical processing node(s) in a network(s)). As illustrated, in this example, the network node 700 includes the control system 702 that includes the one or more processors 704 (e.g., CPUs, ASICs, FPGAs, and/or the like), the memory 706, and the network interface 708 and, optionally, the one or more radio units 710 that each includes the one or more transmitters 712 and the one or more receivers 714 coupled to the one or more antennas 716, as described above. The control system 702 may be connected to the radio unit(s) 710 via, for example, an optical cable or the like. The control system 702 is connected to one or more processing nodes 800 coupled to or included as part of a network(s) 802 via the network interface 708. Each processing node 800 includes one or more processors 804 (e.g., CPUs, ASICs, FPGAs, and/or the like), memory 806, and a network interface 808.

In this example, functions 810 of the network node 700 described herein are implemented at the one or more processing nodes 800 or distributed across the control system 702 and the one or more processing nodes 800 in any desired manner. In some particular embodiments, some or all of the functions 810 of the network node 700 described herein are implemented as virtual components executed by one or more virtual machines implemented in a virtual environment(s) hosted by the processing node(s) 800. As will be appreciated by one of ordinary skill in the art, additional signaling or communication between the processing node(s) 800 and the control system 702 is used in order to carry out at least some of the desired functions 810. Notably, in some embodiments, the control system 702 may not be included, in which case the radio unit(s) 710 communicate directly with the processing node(s) 800 via an appropriate network interface(s).

In some embodiments, a computer program including instructions which, when executed by at least one processor, causes the at least one processor to carry out the functionality of network node 700 or a node (e.g., a processing node 800) implementing one or more of the functions 810 of the network node 700 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 12:
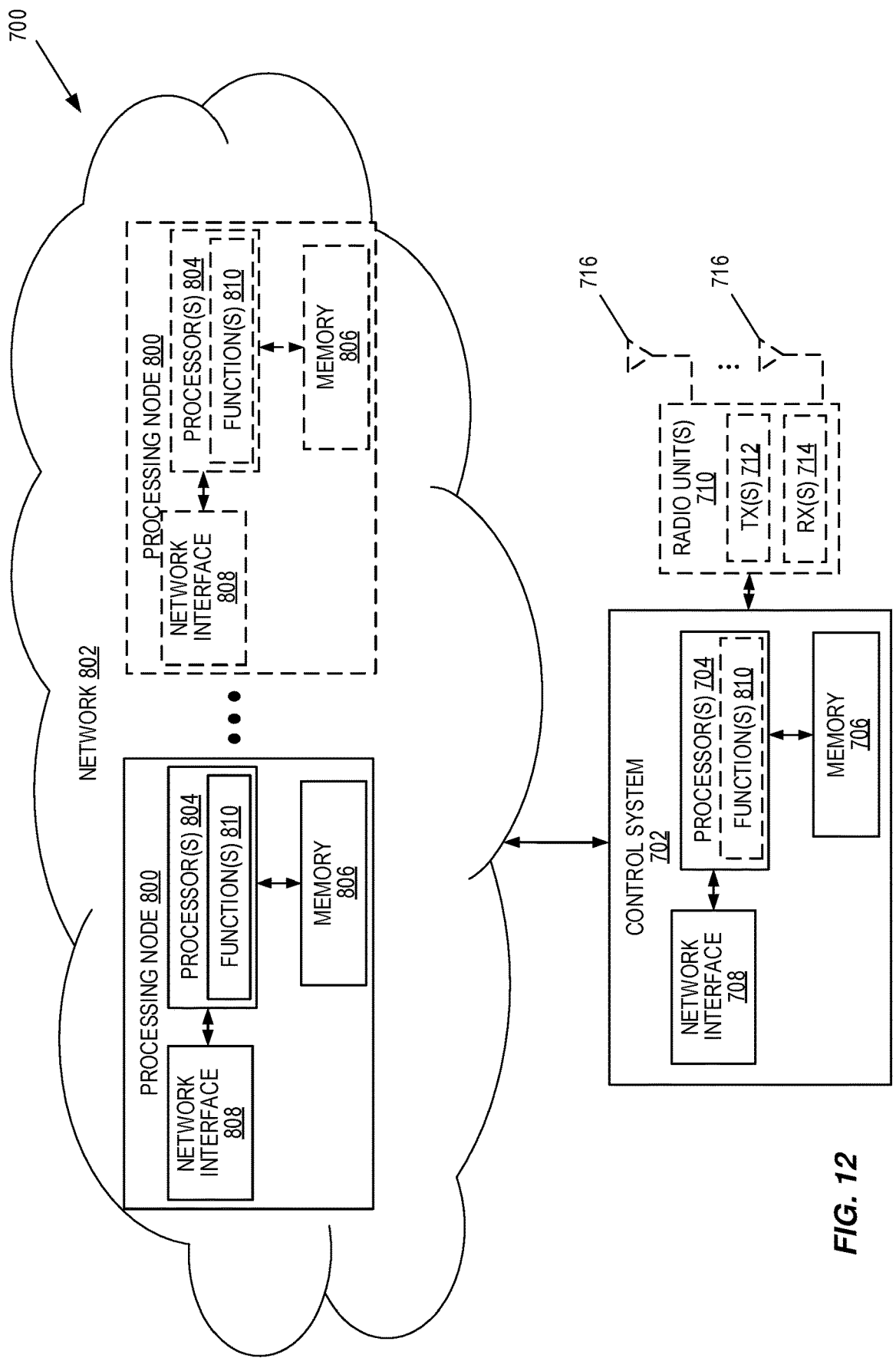
FIG. 12 is a schematic block diagram illustrating a virtualization environment in which functions implemented by some embodiments of the present disclosure may be virtualized.

FIG. 12 is a schematic block diagram of the network node 700 according to some other embodiments of the present disclosure. The network node 700 includes one or more modules 900, each of which is implemented in software. The module(s) 900 provide the functionality of the network node 700 described herein, e.g., AMF, SMSF, UDM, SMS-GW). This discussion is equally applicable to the processing node 800 of FIG. 8 where the modules 900 may be implemented at one of the processing nodes 800 or distributed across multiple processing nodes 800 and/or distributed across the processing node(s) 800 and the control system 702.

Figure 13:
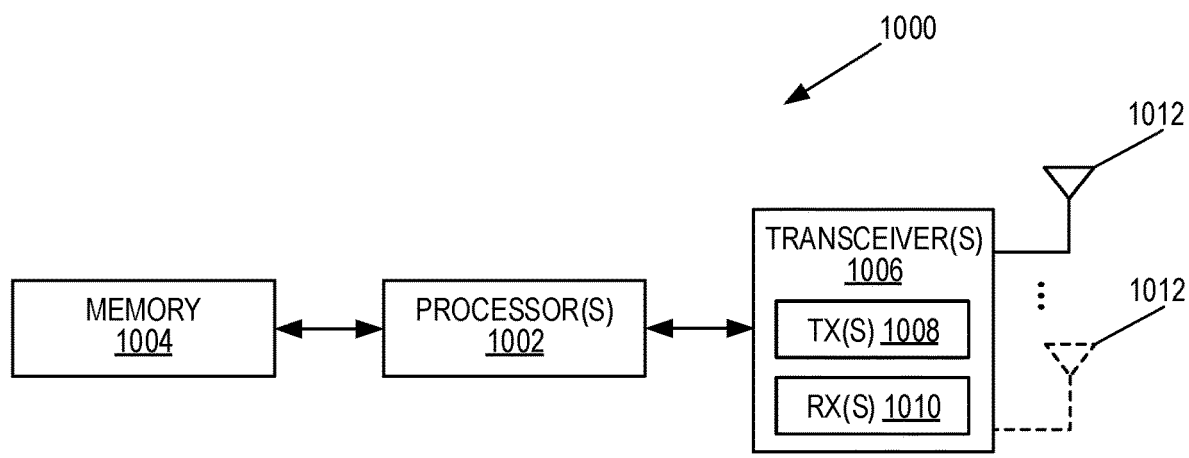
FIG. 13 is a functional block diagram of a wireless device, such as a UE, configured according to one embodiment of the present disclosure.

FIG. 13 is a schematic block diagram of a UE 1000 according to some embodiments of the present disclosure. As illustrated, the UE 1000 includes one or more processors 1002 (e.g., CPUs, ASICs, FPGAs, and/or the like), memory 1004, and one or more transceivers 1006 each including one or more transmitters 1008 and one or more receivers 1010 coupled to one or more antennas 1012. The transceiver(s) 1006 includes radio-front end circuitry connected to the antenna(s) 1012 that is configured to condition signals communicated between the antenna(s) 1012 and the processor(s) 1002, as will be appreciated by on of ordinary skill in the art. The processors 1002 are also referred to herein as processing circuitry. The transceivers 1006 are also referred to herein as radio circuitry. In some embodiments, the functionality of the UE 1000 described above may be fully or partially implemented in software that is, e.g., stored in the memory 1004 and executed by the processor(s) 1002. Note that the UE 1000 may include additional components not illustrated in FIG. 10 such as, e.g., one or more user interface components (e.g., an input/output interface including a display, buttons, a touch screen, a microphone, a speaker(s), and/or the like and/or any other components for allowing input of information into the UE 1000 and/or allowing output of information from the UE 1000), a power supply (e.g., a battery and associated power circuitry), etc.

In some embodiments, a computer program including instructions which, when executed by at least one processor, causes the at least one processor to carry out the functionality of the UE 1000 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 14:
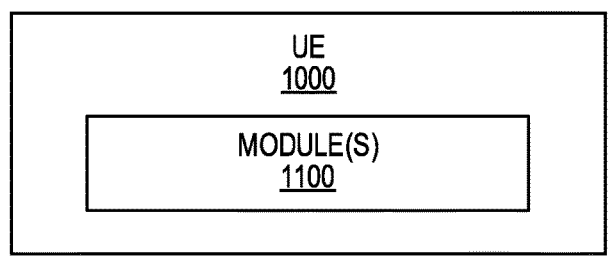
FIG. 14 is a functional block diagram of a wireless device, such as a UE, configured according to another embodiment of the present disclosure.

FIG. 14 is a schematic block diagram of the UE 1000 according to some other embodiments of the present disclosure. The UE 1000 includes one or more modules 1100, each of which is implemented in software. The module(s) 1100 provide the functionality of the UE 1000 described herein.

Figure 15:
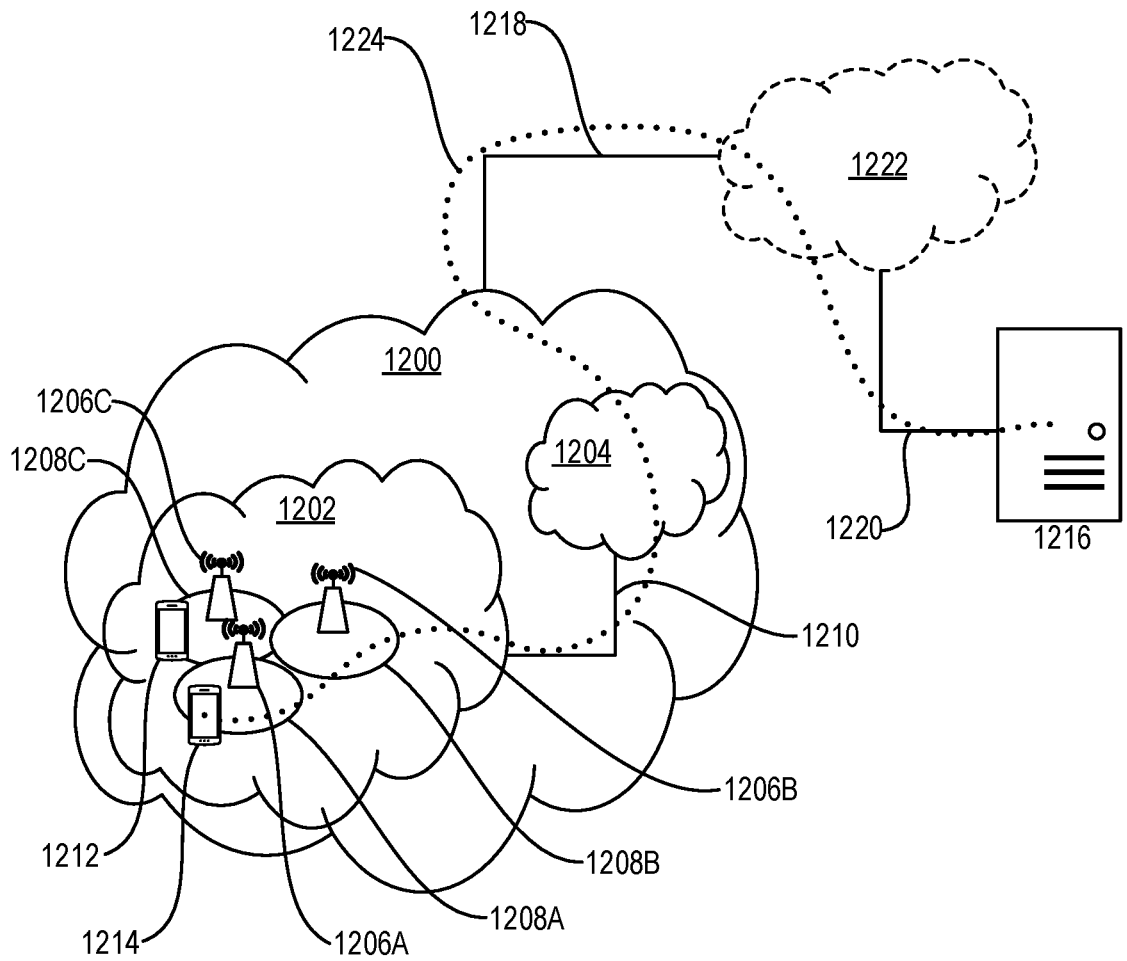
FIG. 15 illustrates an exemplary wireless network according to one embodiment of the present disclosure.

FIG. 15 illustrates a telecommunication network according to some embodiments of the present disclosure. With reference to FIG. 15, in accordance with an embodiment, a communication system includes a telecommunication network 1200, such as a 3GPP-type cellular network, which comprises an access network 1202, such as a RAN, and a core network 1204. The access network 1202 comprises a plurality of base stations 1206A, 1206B, 1206C, such as Node Bs, eNBs, gNBs, or other types of wireless Access Points (APs), each defining a corresponding coverage area 1208A, 1208B, 1208C. Each base station 1206A, 1206B, 1206C is connectable to the core network 1204 over a wired or wireless connection 1210. A first UE 1212 located in coverage area 1208C is configured to wirelessly connect to, or be paged by, the corresponding base station 1206C. A second UE 1214 in coverage area 1208A is wirelessly connectable to the corresponding base station 1206A. While a plurality of UEs 1212, 1214 are illustrated in this example, the disclosed embodiments are equally applicable to a situation where a sole UE is in the coverage area or where a sole UE is connecting to the corresponding base station 1206.

The telecommunication network 1200 is itself connected to a host computer 1216, which may be embodied in the hardware and/or software of a standalone server, a cloud-implemented server, a distributed server, or as processing resources in a server farm.

The host computer 1216 may be under the ownership or control of a service provider, or may be operated by the service provider or on behalf of the service provider.

Connections 1218 and 1220 between the telecommunication network 1200 and the host computer 1216 may extend directly from the core network 1204 to the host computer 1216 or may go via an optional intermediate network 1222. The intermediate network 1222 may be one of, or a combination of more than one of, a public, private, or hosted network; the intermediate network 1222, if any, may be a backbone network or the Internet; in particular, the intermediate network 1222 may comprise two or more sub-networks (not shown).

The communication system of FIG. 15 as a whole enables connectivity between the connected UEs 1212, 1214 and the host computer 1216. The connectivity may be described as an Over-the-Top (OTT) connection 1224. The host computer 1216 and the connected UEs 1212, 1214 are configured to communicate data and/or signaling via the OTT connection 1224, using the access network 1202, the core network 1204, any intermediate network 1222, and possible further infrastructure (not shown) as intermediaries. The OTT connection 1224 may be transparent in the sense that the participating communication devices through which the OTT connection 1224 passes are unaware of routing of uplink and downlink communications. For example, the base station 1206 may not or need not be informed about the past routing of an incoming downlink communication with data originating from the host computer 1216 to be forwarded (e.g., handed over) to a connected UE 1212. Similarly, the base station 1206 need not be aware of the future routing of an outgoing uplink communication originating from the UE 1212 towards the host computer 1216.

Figure 16:
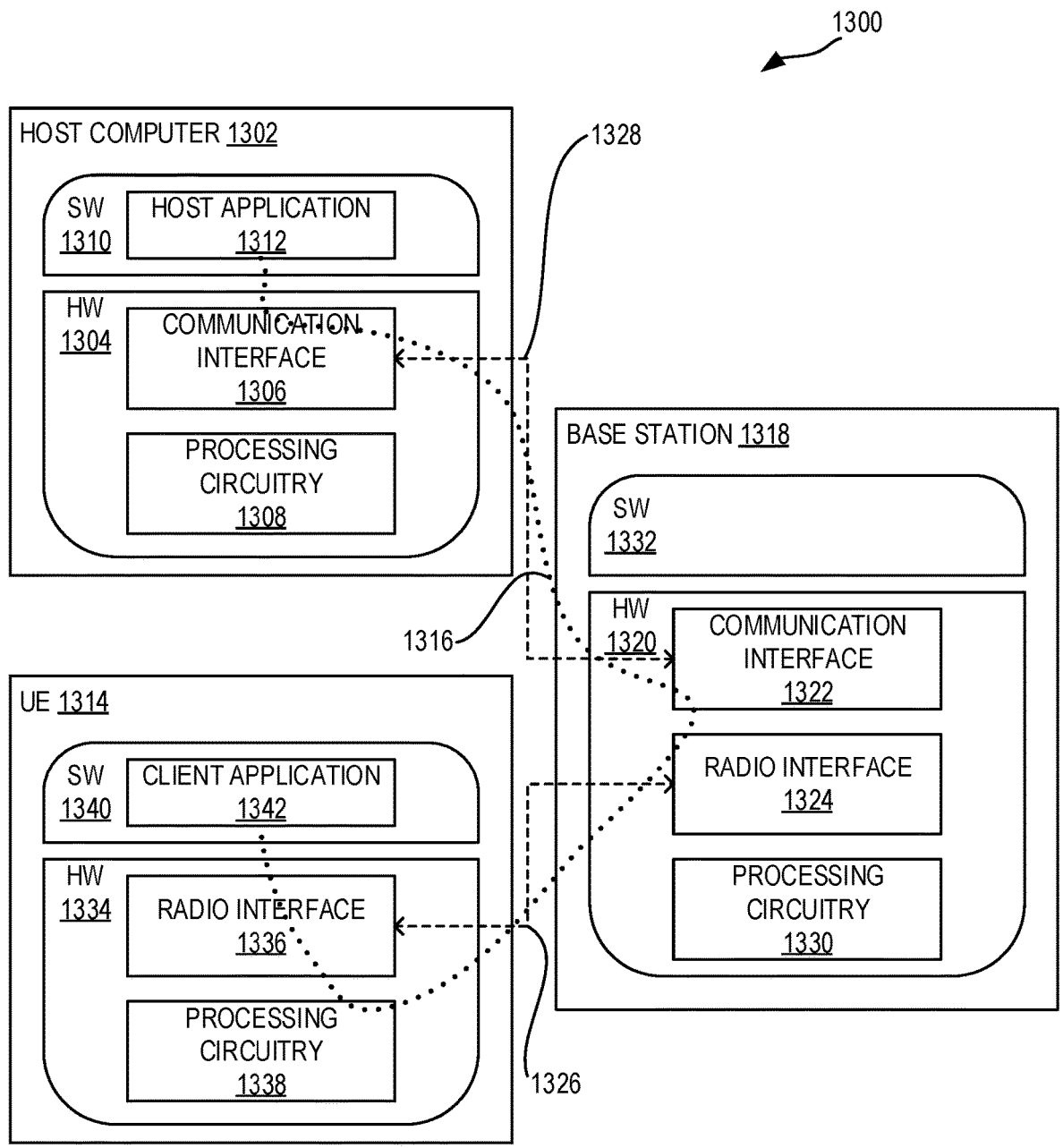
FIG. 16 illustrates a host computer communicating via a base station with a UE over a partially wireless connection in accordance with some embodiments of the present disclosure.

FIG. 16 illustrates a communication system according to some embodiments of the present disclosure. Example implementations, in accordance with an embodiment, of the UE, base station, and host computer discussed in the preceding paragraphs will now be described with reference to FIG. 16. In a communication system 1300, a host computer 1302 comprises hardware 1304 including a communication interface 1306 configured to set up and maintain a wired or wireless connection with an interface of a different communication device of the communication system 1300. The host computer 1302 further comprises processing circuitry 1308, which may have storage and/or processing capabilities. In particular, the processing circuitry 1308 may comprise one or more programmable processors, ASICs, FPGAs, or combinations of these (not shown) adapted to execute instructions. The host computer 1302 further comprises software 1310, which is stored in or accessible by the host computer 1302 and executable by the processing circuitry 1308. The software 1310 includes a host application 1312. The host application 1312 may be operable to provide a service to a remote user, such as a UE 1314 connecting via an OTT connection 1316 terminating at the UE 1314 and the host computer 1302. In providing the service to the remote user, the host application 1312 may provide user data which is transmitted using the OTT connection 1316.

The communication system 1300 further includes a base station 1318 provided in a telecommunication system and comprising hardware 1320 enabling it to communicate with the host computer 1302 and with the UE 1314. The hardware 1320 may include a communication interface 1322 for setting up and maintaining a wired or wireless connection with an interface of a different communication device of the communication system 1300, as well as a radio interface 1324 for setting up and maintaining at least a wireless connection 1326 with the UE 1314 located in a coverage area (not shown in FIG. 13) served by the base station 1318. The communication interface 1322 may be configured to facilitate a connection 1328 to the host computer 1302. The connection 1328 may be direct or it may pass through a core network (not shown in FIG. 13) of the telecommunication system and/or through one or more intermediate networks outside the telecommunication system. In the embodiment shown, the hardware 1320 of the base station 1318 further includes processing circuitry 1330, which may comprise one or more programmable processors, ASICs, FPGAs, or combinations of these (not shown) adapted to execute instructions. The base station 1318 further has software 1332 stored internally or accessible via an external connection.

The communication system 1300 further includes the UE 1314 already referred to. The UE's 1314 hardware 1334 may include a radio interface 1336 configured to set up and maintain a wireless connection 1326 with a base station serving a coverage area in which the UE 1314 is currently located. The hardware 1334 of the UE 1314 further includes processing circuitry 1338, which may comprise one or more programmable processors, ASICs, FPGAs, or combinations of these (not shown) adapted to execute instructions. The UE 1314 further comprises software 1340, which is stored in or accessible by the UE 1314 and executable by the processing circuitry 1338. The software 1340 includes a client application 1342. The client application 1342 may be operable to provide a service to a human or non-human user via the UE 1314, with the support of the host computer 1302. In the host computer 1302, the executing host application 1312 may communicate with the executing client application 1342 via the OTT connection 1316 terminating at the UE 1314 and the host computer 1302. In providing the service to the user, the client application 1342 may receive request data from the host application 1312 and provide user data in response to the request data.

The OTT connection 1316 may transfer both the request data and the user data. The client application 1342 may interact with the user to generate the user data that it provides.

It is noted that the host computer 1302, the base station 1318, and the UE 1314 illustrated in FIG. 13 may be similar or identical to the host computer 1216, one of the base stations 1206A, 1206B, 1206C, and one of the UEs 1212, 1214 of FIG. 12, respectively. This is to say, the inner workings of these entities may be as shown in FIG. 13 and independently, the surrounding network topology may be that of FIG. 12.

In FIG. 16, the OTT connection 1316 has been drawn abstractly to illustrate the communication between the host computer 1302 and the UE 1314 via the base station 1318 without explicit reference to any intermediary devices and the precise routing of messages via these devices. The network infrastructure may determine the routing, which may be configured to hide from the UE 1314 or from the service provider operating the host computer 1302, or both. While the OTT connection 1316 is active, the network infrastructure may further take decisions by which it dynamically changes the routing (e.g., on the basis of load balancing consideration or reconfiguration of the network).

The wireless connection 1326 between the UE 1314 and the base station 1318 is in accordance with the teachings of the embodiments described throughout this disclosure. One or more of the various embodiments improve the performance of OTT services provided to the UE 1314 using the OTT connection 1316, in which the wireless connection 1326 forms the last segment. More precisely, the teachings of these embodiments may provide for the ability to measure data usage in terms of packets and thereby provide benefits such as enhance the system's ability to derive a proper traffic model in the mobile network, which is vital for dimensioning and deployment.

A measurement procedure may be provided for the purpose of monitoring data rate, latency, and other factors on which the one or more embodiments improve. There may further be an optional network functionality for reconfiguring the OTT connection 1316 between the host computer 1302 and the UE 1314, in response to variations in the measurement results. The measurement procedure and/or the network functionality for reconfiguring the OTT connection 1316 may be implemented in the software 1310 and the hardware 1304 of the host computer 1302 or in the software 1340 and the hardware 1334 of the UE 1314, or both. In some embodiments, sensors (not shown) may be deployed in or in association with communication devices through which the OTT connection 1316 passes; the sensors may participate in the measurement procedure by supplying values of the monitored quantities exemplified above, or supplying values of other physical quantities from which the software 1310, 1340 may compute or estimate the monitored quantities. The reconfiguring of the OTT connection 1316 may include message format, retransmission settings, preferred routing, etc.; the reconfiguring need not affect the base station 1318, and it may be unknown or imperceptible to the base station 1318. Such procedures and functionalities may be known and practiced in the art. In certain embodiments, measurements may involve proprietary UE signaling facilitating the host computer 1302's measurements of throughput, propagation times, latency, and the like. The measurements may be implemented in that the software 1310 and 1340 causes messages to be transmitted, in particular empty or 'dummy' messages, using the OTT connection 1316 while it monitors propagation times, errors, etc.

FIG. 17 is a flowchart illustrating a method implemented in a communication system, in accordance with one embodiment. The communication system includes a host computer, a base station, and a UE which may be those described with reference to FIGS. 15 and 16. For simplicity of the present disclosure, only drawing references to FIG. 17 will be included in this section. In step 1400, the host computer provides user data. In sub-step 1402 (which may be optional) of step 1400, the host computer provides the user data by executing a host application. In step 1404, the host computer initiates a transmission carrying the user data to the UE. In step 1406 (which may be optional), the base station transmits to the UE the user data which was carried in the transmission that the host computer initiated, in accordance with the teachings of the embodiments described throughout this disclosure. In step 1408 (which may also be optional), the UE executes a client application associated with the host application executed by the host computer.

FIG. 18 is a flowchart illustrating a method implemented in a communication system, in accordance with one embodiment. The communication system includes a host computer, a base station, and a UE which may be those described with reference to FIGS. 15 and 16. For simplicity of the present disclosure, only drawing references to FIG. 18 will be included in this section. In step 1500 of the method, the host computer provides user data. In an optional sub-step (not shown) the host computer provides the user data by executing a host application. In step 1502, the host computer initiates a transmission carrying the user data to the UE. The transmission may pass via the base station, in accordance with the teachings of the embodiments described throughout this disclosure. In step 1504 (which may be optional), the UE receives the user data carried in the transmission.

Figures 19, 20:
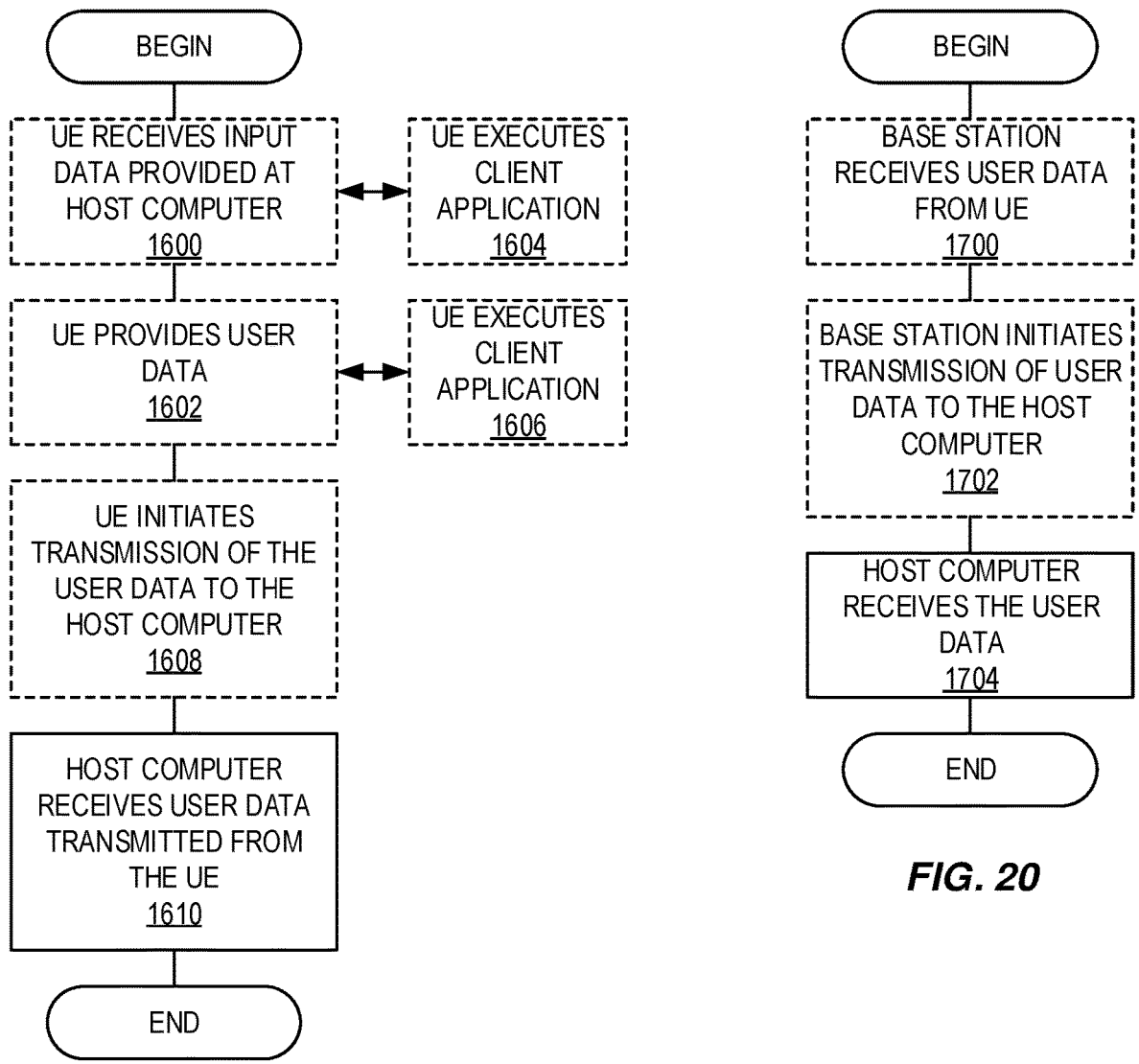
FIG. 19 is a flowchart illustrating a method implemented in a communication system, in accordance with one embodiment.
FIG. 20 is a flowchart illustrating a method implemented in a communication system, in accordance with one embodiment.

FIG. 19 is a flowchart illustrating a method implemented in a communication system, in accordance with one embodiment. The communication system includes a host computer, a base station, and a UE which may be those described with reference to FIGS. 15 and 16. For simplicity of the present disclosure, only drawing references to FIG. 19 will be included in this section. In step 1600 (which may be optional), the UE receives input data provided by the host computer. Additionally, or alternatively, in step 1602, the UE provides user data. In sub-step 1604 (which may be optional) of step 1600, the UE provides the user data by executing a client application. In sub-step 1606 (which may be optional) of step 1602, the UE executes a client application which provides the user data in reaction to the received input data provided by the host computer. In providing the user data, the executed client application may further consider user input received from the user. Regardless of the specific manner in which the user data was provided, the UE initiates, in sub-step 1608 (which may be optional), transmission of the user data to the host computer. In step 1610 of the method, the host computer receives the user data transmitted from the UE, in accordance with the teachings of the embodiments described throughout this disclosure.

FIG. 20 is a flowchart illustrating a method implemented in a communication system, in accordance with one embodiment. The communication system includes a host computer, a base station, and a UE which may be those described with reference to FIGS. 14 and 15. For simplicity of the present disclosure, only drawing references to FIG. 20 will be included in this section. In step 1700 (which may be optional), in accordance with the teachings of the embodiments described throughout this disclosure, the base station receives user data from the UE. In step 1702 (which may be optional), the base station initiates transmission of the received user data to the host computer. In step 1704 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

EMBODIMENTS

UE Embodiments

1. A method performed by a wireless device, the method comprising:
Determining that two or more PDU sessions associated to at least one DNN or to at least one S-NSSAI should be released;
Transmitting to a control entity of a core network one NAS message indicating one of the at least one DNN or the at least one S-NSSAI for which the corresponding PDU sessions should be released all at once.

2. The method of embodiment 1 wherein the NAS message comprises the list of the PDU session identifiers to be release for the at least one DNN or the at least one S-NSSAI.

3. The method of embodiment 1 wherein transmitting one NAS message indicating one of the at least one DNN or the at least one S-NSSAI for which the PDU sessions should be released all at once is conditional to negotiating the use of the bulk PDU session release or DNN or S-NSSAI based release capability with the network.

4. The method of embodiment 3 wherein negotiating the use of the bulk PDU session release or DNN or S-NSSAI based release capability further comprises sending to the control entity in the control network a capability indication indicating the wireless device supports and/or enables bulk PDU session release or DNN based PDU session release or SNSSAI based PDU session release; and receiving from the core network an indication of the Core network support of the same feature, wherein the indication may indicate support or no support of the bulk PDU session release or DNN based PDU session release or SNSSAI based PDU session release.

CP/AMF Embodiments

5. A method performed by a core network control plane entity, the method comprising:
receiving from a wireless device a NAS message indicating a request to release PDU sessions all at once for one of the at least one DNN or the at least one S-NSSAI;
determining one or more session management functions (SMFs) supporting the PDU sessions to be released and transmitting a request to release the PDU sessions for the UE; and
upon receiving at least one response message from one of the one or more SMFs or upon receiving all response messages from all the one or more SMFs, sending a response message to the wireless device indicating the result of the request to release the PDU sessions all at once.

6. The method of embodiment 5 wherein the NAS message comprises the list of the PDU session identifiers to be release for the at least one DNN or the at least one S-NSSAI.

7. The method of embodiment 6 wherein the method further comprises receiving a capability indication indicating the wireless device supports and/or enables bulk PDU session release or DNN based PDU session release or SNSSAI based PDU session release feature; and Indicating to the wireless device whether the same feature is supported or not.

Apparatus Embodiments

8. A UE or a wireless device comprising a processing circuitry and memory, the memory containing instructions executable by the processing circuitry whereby the wireless device is configured to perform any of the embodiments 1-4.
9. A UE or a wireless device adapted to perform any of the embodiments 1-4.
10. A control plane entity comprising a processing circuitry and memory, the memory containing instructions executable by the processing circuitry whereby the control plane entity is configured to perform any of the embodiments 5-7.
11. A control plane, CP, entity adapted to perform any of the embodiments 5-7.
12. A computer program comprising instructions which, when executed by at least one processor of a wireless device, causes the wireless device to carry out the steps of any of the UE/wireless device embodiments.
13. A carrier containing the computer program of embodiment 12, wherein the carrier is one of an electronic signal, optical signal, radio signal, or computer readable storage medium.
14. A computer program comprising instructions which, when executed by at least one processor of a CP entity, causes the CP entity to carry out the steps of any of the CP/AMF entity embodiments.
15. A carrier containing the computer program of embodiment 14, wherein the carrier is one of an electronic signal, optical signal, radio signal, or computer readable storage medium.

Abbreviations

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AMF Access and Mobility Management Function
AN Access Network
ASIC Application Specific Integrated Circuit
AUSF Authentication Server Function
CP Control Plane
CPU Central Processing Unit
DSP Digital Signal Processor
DNN Data Network Name
FPGA Field Programmable Gate Array
gNB New Radio Base Station
NEF Network Exposure Function
NF Network Function
NR New Radio
NRF Network Function Repository Function
NSSAI Network Slice Selection Function
NSSF Network Slice Selection Function
PCF Policy Control Function
PDU Protocol Data Unit
RAN Radio Access Network
S-NSSAI Single Network Slice Selection Assistance Information
SMF Session Management Function
SMS Short Message Service
SMSF Short Message Service Function
SMS-GW Short Message Service Gateway
TS Technical Specification
UDM Unified Data Management
UE User Equipment

The invention claimed is:

1. A method performed by a wireless device, the method comprising:
    determining that two or more Packet Data Unit, PDU, sessions associated to at least one Data network identified by a Data Network Name, DNN, or to at least one Single Network Slice Assisted Information, S-NSSAI, should be released;
    transmitting to a control entity of a core network, a Non-Access-Stratum, NAS, message to request release all at once of the two or more PDU sessions associated to at least one of: the at least one DNN or the at least one S-NSSAI, wherein the NAS message comprises the at least one of: the at least one DNN or the at least one S-NSSAI;
    wherein transmitting the NAS message is conditional to negotiating the use of a bulk PDU session release or DNN or S-NSSAI based release capability with the control entity of the core network, wherein the capability indicates that multiple PDU sessions associated to a DNN or an S-NSSAI can be release all at once with a single NAS message request.

2. The method of claim 1 wherein the NAS message comprises a list of PDU session identifiers to be release for the at least one DNN or the at least one S-NSSAI.

3. The method of claim 1 wherein negotiating the use of the bulk PDU session release or the DNN or S-NSSAI based release capability further comprises sending to the control entity in the control network a registration message or a PDU session establishment request message comprising a capability indication indicating the wireless device supports and/or enables bulk PDU session release or DNN based PDU session release or SNSSAI based PDU session release; and
    receiving from the core network an indication indicating whether the core network supports or does not support the bulk PDU session release or the DNN based PDU session release or the SNSSAI based PDU session release.

4. A method performed by a core network control plane entity, the method comprising:
    receiving from a wireless device a Non-Access Stratum, NAS, message comprising a single request to release multiple Packet Data Unit, PDU, sessions, associated with at least one Data Network Name, DNN, or at least one Single Network Slice Network Assistance Information, S-NSSAI;
    determining one or more session management functions (SMFs) associated to the multiple PDU sessions to be released and transmitting a request to the one or more SMFs to release the associated PDU sessions for the UE; and
    upon receiving at least one response message from one of the one or more SMFs or upon receiving a response message from all of the one or more SMFs, sending a response message to the wireless device indicating the result of the single request to release the multiple PDU sessions associated with the at least one DNN or the at least one S-NSSAI.

5. The method of claim 4 wherein the NAS message comprises a list of PDU session identifiers of the multiple PDU sessions to release for the at least one DNN or the at least one S-NSSAI.

6. The method of claim 5 wherein the method further comprises receiving a capability indication indicating whether the wireless device supports and/or enables bulk PDU session release or DNN based PDU session release or SNSSAI based PDU session release; and
   indicating to the wireless device whether the capability is supported and enabled in the core network.

7. A wireless device comprising a processing circuitry and memory, the memory containing instructions executable by the processing circuitry whereby the wireless device is configured to:
   determine that two or more Packet Data Unit, PDU, sessions associated to at least one Data network identified by a Data Network Name, DNN, or to at least one Single Network Slice Assisted Information, S-NSSAI, should be released;
   transmit to a control entity of a core network, a Non-Access-Stratum, NAS, message to release the corresponding two or more PDU sessions associated to at least one of: the at least one DNN or the at least one S-NSSAI, where the NAS message comprises the at least one of: the at least one DNN or the at least one S-NSSAI;
   wherein when configured to transmit the NAS message is conditional to the wireless device being configured to negotiate the use of a bulk PDU session release or DNN or S-NSSAI based release capability with the control entity of the core network.

8. The wireless device of claim 7 wherein the NAS message comprises a list of PDU session identifiers to be release for the at least one DNN or the at least one S-NSSAI.

9. The wireless device of claim 7 wherein the wireless device is further configured to receive from the core network an indication of the core network support of the same feature, wherein the indication indicates whether the core network supports or does not support the bulk PDU session release or the DNN based PDU session release or the SNSSAI based PDU session release.

* * * * *